United States Patent [19]
Sakamoto et al.

[11] Patent Number: 5,818,950
[45] Date of Patent: Oct. 6, 1998

[54] SPEAKER SYSTEM AND ITS SUPPORT LEGS

[75] Inventors: Yoshio Sakamoto, Hachiouji; Junichi Hayakawa, Kawasaki; Syuuhei Ohta, Hachiouji; Shirou Iwakura, Hamura, all of Japan

[73] Assignee: Kabushiki Kaisha Kenwood, Tokyo, Japan

[21] Appl. No.: 391,950

[22] Filed: Feb. 21, 1995

[30] Foreign Application Priority Data

Feb. 25, 1994 [JP] Japan .................................. 6-051078

[51] Int. Cl.$^6$ .................................................. H04R 25/00
[52] U.S. Cl. .............................. 381/201; 381/203; 381/24
[58] Field of Search .............................. 381/24, 90, 152, 381/199, 200, 201; 352/1, 9, 10, 11

[56] References Cited

U.S. PATENT DOCUMENTS

| | | | |
|---|---|---|---|
| 4,646,349 | 2/1987 | Puls | 381/24 |
| 4,903,300 | 2/1990 | Polk | 381/24 |
| 4,998,283 | 3/1991 | Nishida et al. | 381/90 |
| 5,361,380 | 11/1994 | You et al. | 381/24 |
| 5,668,886 | 9/1997 | Sakamoto et al. | 381/199 |

Primary Examiner—Forester W. Isen
Attorney, Agent, or Firm—Sixbey, Friedman, Leedom & Ferguson, P.C.; Gerald J. Ferguson, Jr.

[57] ABSTRACT

A very thin screen speaker and a support leg for supporting the screen speaker without a dead space of installing the screen speaker. There is provided a speaker system having a screen for image projection formed on a front plate constituting a cabinet of the speaker system, wherein a diaphragm system is disposed between the front plate and a back plate constituting the cabinet, the diaphragm system being assembled by components including a voice coil, a diaphragm, and a suspension, and the depth of both the sound paths being equal to the distance from the inner surface of the front plate to the inner surface of the rear plate.

22 Claims, 28 Drawing Sheets

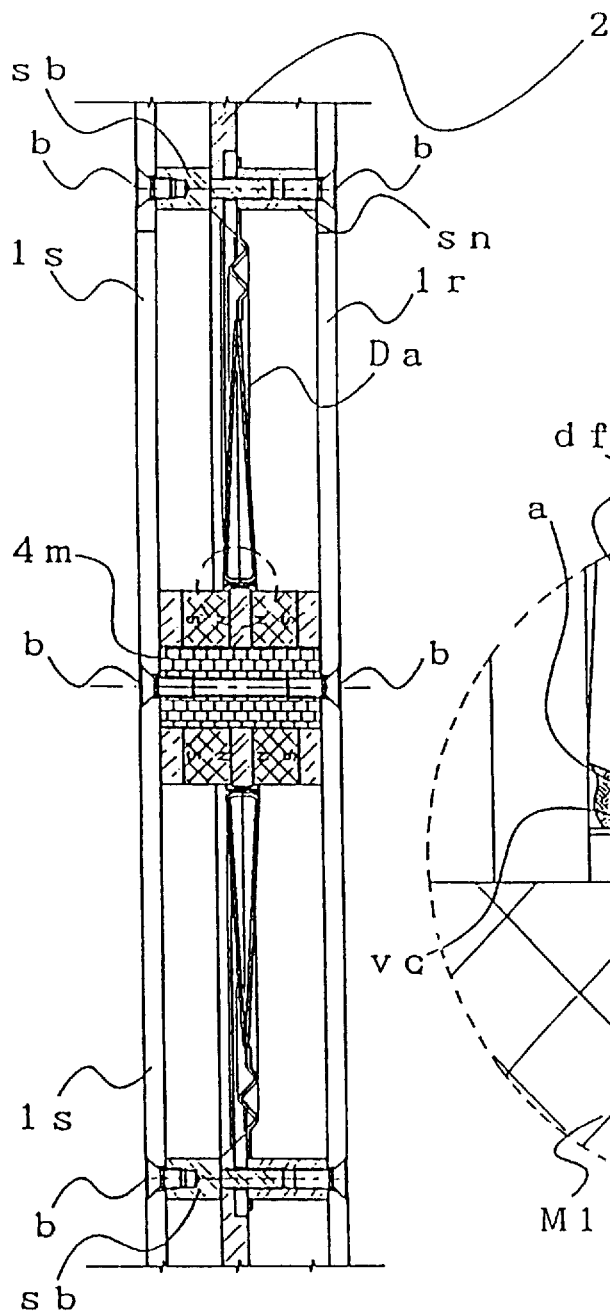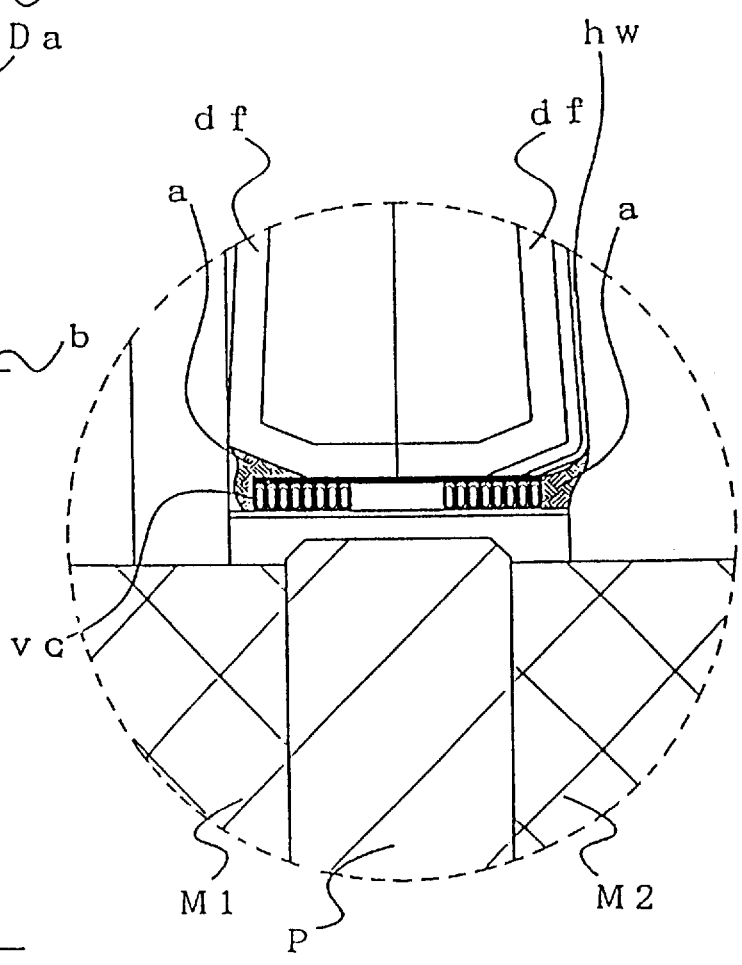
Fig.10A
Fig.10B

Fig.23A
Fig.23B
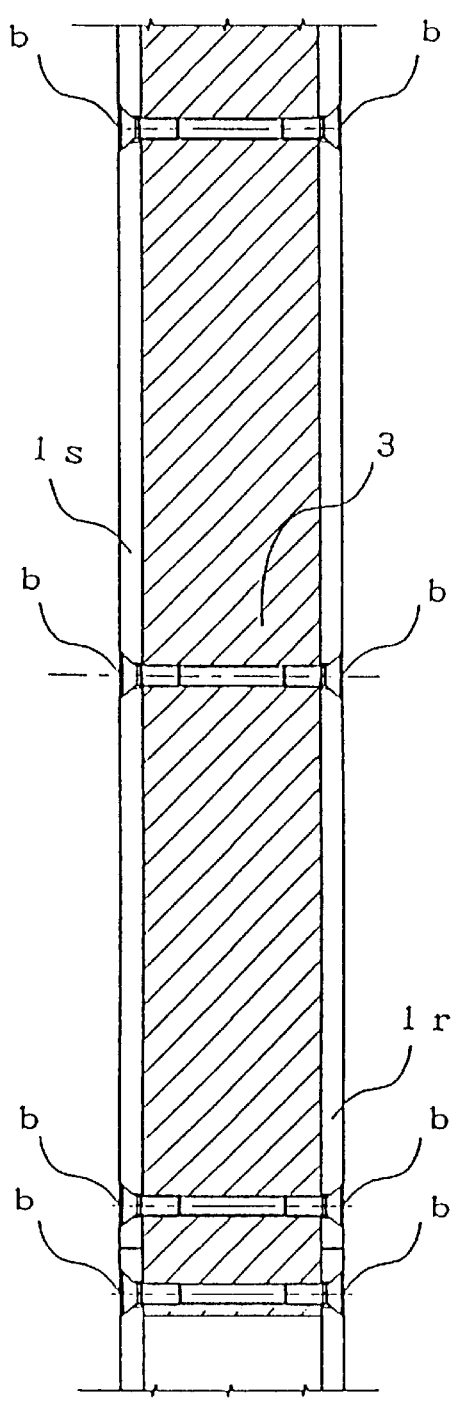
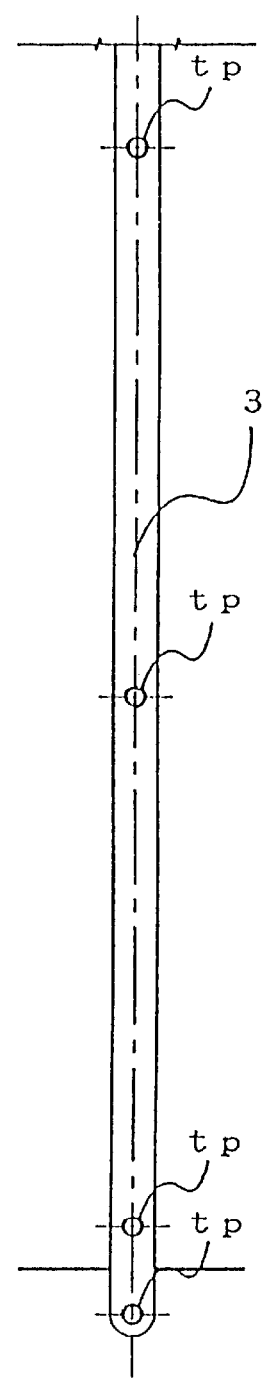

SPEAKER SYSTEM AND ITS SUPPORT LEGS

BACKGROUND OF THE INVENTION

1. Field of the Invention

The present invention relates to a speaker system and a support leg for the speaker system, and more particularly to a thin speaker system (hereinafter called a screen speaker) in which a screen for image projection is formed on a partial area of the cabinet of the thin speaker system, for example, on a side wall corresponding to the baffle which constitutes the cabinet, and a support leg most suitable for such a screen speaker.

Specifically, the invention relates to a speaker system capable of considerably reducing the depth of the cabinet inclusive of the screen, for example, the depth of the cabinet being set to 45 mm or smaller and the depth of the inside of the cabinet being set to 35 mm or smaller.

2. Related Background Art

Conventional screen speakers having a screen diagonal length of 500 mm or longer are known as proposed, for example, in Japanese Patent Laid-open Publication Nos. 4-42700 and 3-147498. The screen speaker of Japanese Patent Laid-open Publication No.4-42700 has the structure that piezoelectric elements are directly attached to the screen. Although this system is suitable for thinning the depth of the cabinet, the reproduction frequency bandwidth and efficiency of piezoelectric elements are narrower and lower than a general moving coil (M.C.) type speaker. This system has presently the performance insufficient for an AV speaker.

Most of speaker systems using an M.C. type speaker have a maximum cabinet depth of about 100 mm.

FIGS. 28A and 28B are a front view and a side view showing the outline of a screen speaker. A cabinet is constituted by a front plate 1s, a rear plate 1r, a top plate 1u, and a bottom plate 1b. A screen 1 is formed on the front plate 1s. In the figure, Ss represents a side speaker housing, sp represents a speaker, Tw represents a tweeter, and Sd represents a duct.

Of such screen speakers, for example, of the screen speakers proposed in Japanese Patent Laid-open Publication No. 3-147498, one screen speaker system has low frequency speakers mounted on the bottom plate 1b and middle and high frequency speakers mounted on the side speaker housing Ss, and another screen speaker system has low, middle, and high frequency speakers mounted on the sides of, or under, the screen on the cabinet. The depth of the cabinet is 10 cm, and the specification discloses that these systems are installed near a wall or the speakers are embedded in the wall.

The speaker system of Japanese Patent Laid-open Publication No. 3-147498 has speakers mounted on the bottom plate. Therefore, the shape of a diaphragm is restricted if the depth of the cabinet is to be reduced to thin the speaker system.

The contents of other embodiments have been studied and the following problem has been found. The diaphragm of a low frequency speaker is generally and essentially heavy and its amplitude is large. Therefore, the size of a magnetic circuit structure for driving the diaphragm of a low frequency speaker becomes larger than those for driving middle and high frequency speaker diaphragms, leaving a limit in thinning the speaker system.

The present inventors have devised the acoustic circuit by using a generally used low frequency speaker to thin the speaker system (for example, Japanese Utility Model Publication No. 3-28895 and others). However, this speaker system has the structure that a partition plate for partitioning the inside of the cabinet extends over the whole front surface. Therefore, the depth of a sound path becomes extremely short and the acoustic loss (resistance) increases resulting in insufficient low frequency sounds. This is a problem to be solved. The strict constrains of further thinning a speaker system are the depth of a cabinet and the thickness of plates constituting the cabinet. The depth of a cabinet has a limit of about 50 to 60 mm when the sound quality and the cabinet strength are taken into consideration.

If a screen speaker is installed in a room, it is often installed in tight contact with the wall W of a room in order to efficiently use the space of the room. For the efficient use of the room space, i.e., for the reduction of the installation area of the screen speaker, it is desired that the depth of the screen speaker is made as small as possible. Obviously, it is preferable to reduce the depth of the screen speaker as much as possible. Moreover, the installation area of a general home AV apparatus has been desired to be small.

Generally, a screen speaker has a thin cabinet structure in the direction perpendicular to the screen. If the thin cabinet is made further thinner, it is likely to fall back or front. In order to prevent the cabinet from falling back or front, the support legs 7 for supporting the cabinet are mounted as shown in FIG. 28, or a screen speaker may be suspended from a ceiling. It is not easy to safely suspend a screen speaker from the ceiling of a general house. Therefore, use of the support legs 7 or the like is effective.

However, in order to securely and stably install a screen speaker and maintain the installation state without tilting it, the depth 7D of the support leg 7 is required to be about 250 mm in the case of the cabinet depth of 60 mm, as shown in FIG. 28.

If a depth of 100 mm of a conventional cabinet is reduced by 40 mm, this cabinet has a depth of 60 mm. However, in order to install this screen speaker near the wall W, the distance 1D from the wall W to the screen 1 of the screen speaker is required to be 155 mm or longer because of the depth 7D of 250 mm of the support leg 7 (the side of the support leg 7 extending on the screen side being neglected since it can be neglected from the viewpoint of space). As a result, even if the depth D of the cabinet is reduced more and more, such a dead space is required and the installation area essentially increases.

SUMMARY OF THE INVENTION

It is an object of the present invention to provide a screen speaker capable of solving the problems of a conventional screen speaker and being thinned, and a support leg for the screen speaker capable of substantially removing a dead space of a conventional screen speaker, particularly the dead space between the rear plate of the screen speaker and a wall, and reducing the installation area by 80% or more as compared to a conventional installation area.

In order to achieve the above object of the invention, there is provided a speaker system having a screen for image projection formed on a front plate constituting a cabinet of the speaker system, wherein a diaphragm system is disposed between the front plate and a back plate constituting the cabinet, the diaphragm system being assembled by components including a voice coil, a diaphragm, a suspension (edge), and a ring disposed at the outer periphery of the suspension, and sound paths are formed for guiding sounds radiated from the front and back sides of the diaphragm system, the depth of both the sound paths being equal to the distance from the inner surface of the front plate to the inner surface of the rear plate.

Specifically, a screen speaker has a screen with a diagonal length of preferably 50 inches or longer, a cabinet maximum depth of 45 mm, and a cabinet inner depth of 35 mm or shorter. The magnetic circuit structure of a speaker is securely interposed directly, or via an intervening member such as a spacer and a frame, between the rear plate and the front plate. A repulsion type magnetic circuit is disposed near the center of the inside between the front plate and the rear plate, the repulsion magnetic circuit being formed by two magnets with the same polarities facing each other, and using repulsion magnetic fluxes of the magnets. The diaphragm system is disposed outside of the magnetic circuit in the cabinet, preferably near the center of the inside between the front plate and the rear plate. Sounds radiated from the diaphragm are guided to the outside of the cabinet at the position other than the front plate. The resonance of the front plate driven by the speaker in the cabinet is positively utilized.

A screen sheet member is directly adhered to the front plate by using adhesive agent, a sticky tape, or the like. Alternatively, material suitable for a screen is coated on the front plate to form the screen. An opening is formed in the front plate. The screen member covering the opening is driven directly or indirectly by the speaker in the cabinet to reproduce desired sounds. In order to further improve the installation space, a rotary member such as a caster is mounted on the lower end of the support leg of the cabinet. The support leg is basically of a "<" shape or a "T" character shape and is adapted to be rotatable.

The screen speaker constructed as above is thinner than a conventional screen speaker, can solve the problems of a conventional screen speaker, and can reduce the installation area by about 80% or more.

BRIEF DESCRIPTION OF THE DRAWINGS

FIG. 10 is a cross sectional view and a partial enlarged view showing the mount state of the speaker diaphragm system and the magnets.

FIG. 17A is a bottom view wherein the screen speaker is installed spaced apart form a wall, and FIG. 17B is a bottom view wherein the screen speaker is installed near the wall.

FIG. 22A is a cross sectional view showing the main part of the joint state by a shaft and a plan view of the shaft, FIG. 22B is a cross sectional view showing the main part of the joint state by a joint block and a plan view of the joint block, and FIG. 22C is a cross sectional view showing the main part of the joint state by a joint plate and a plan view of the joint plate.

FIGS. 23A and 23B show the mount state of a sound path constituting plate, FIG. 23A is a cross sectional view of the sound path constituting plate, and FIG. 23B is a cross sectional view of the sound path constituting plate.

DETAILED DESCRIPTION OF THE PREFERRED EMBODIMENTS

Embodiments of the invention will be described with reference to FIGS. 1 to 27.

Figure 1:
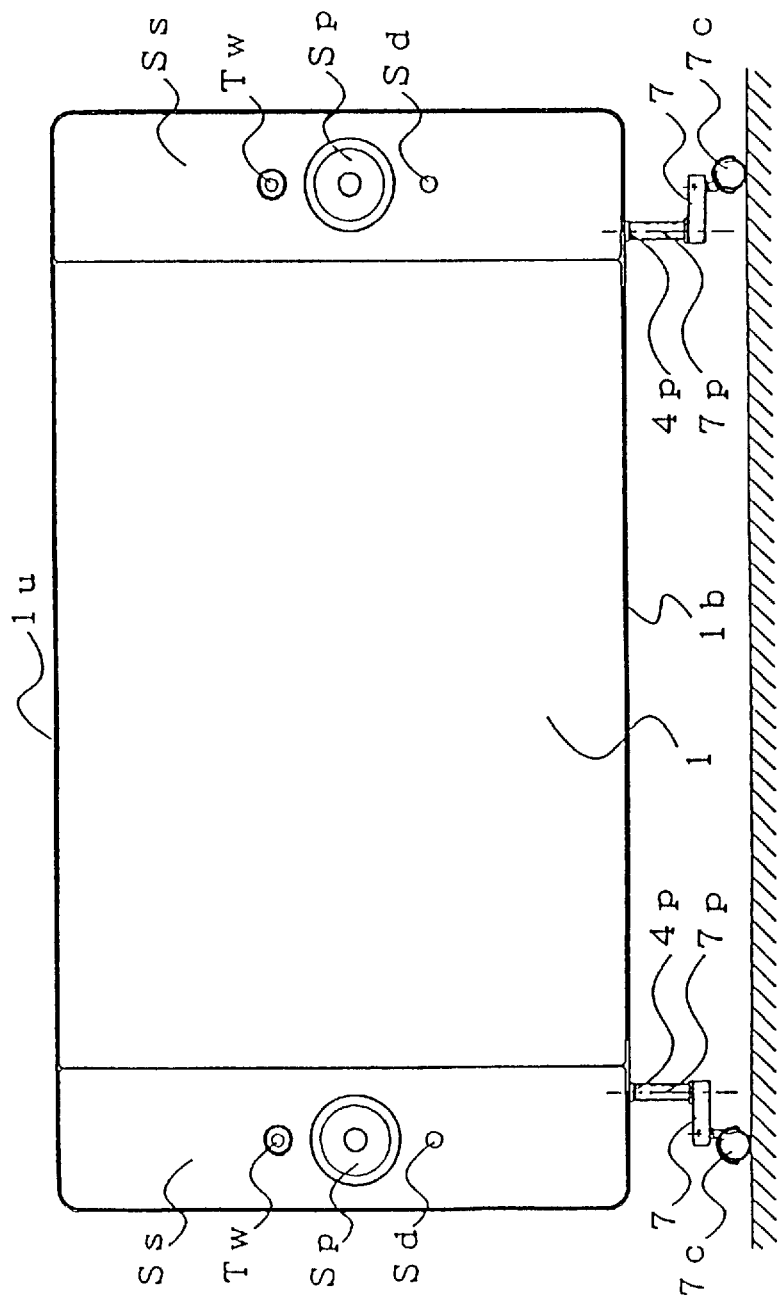
FIG. 1 is a front view showing the overall of a speaker system of the invention.
Figure 2A:
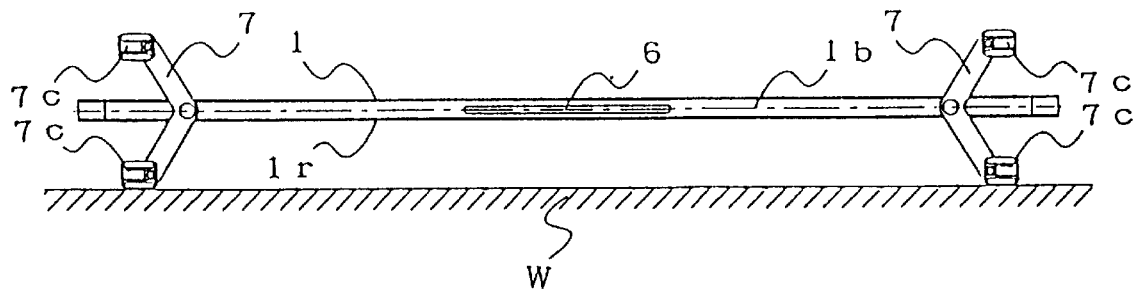
FIGS. 2A and 2B are a bottom view and a side view of the speaker system of the invention.
Figure 2B:
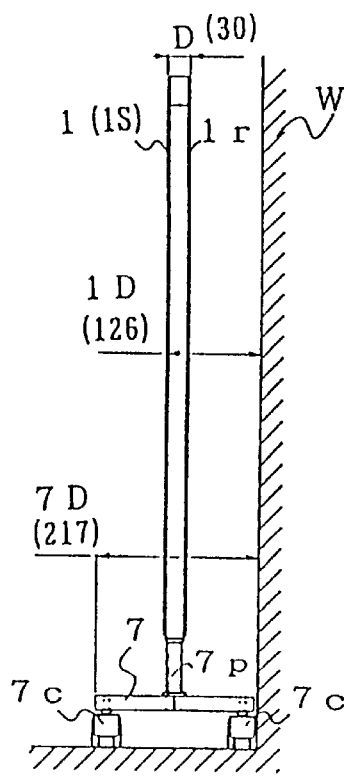
Figure 3:
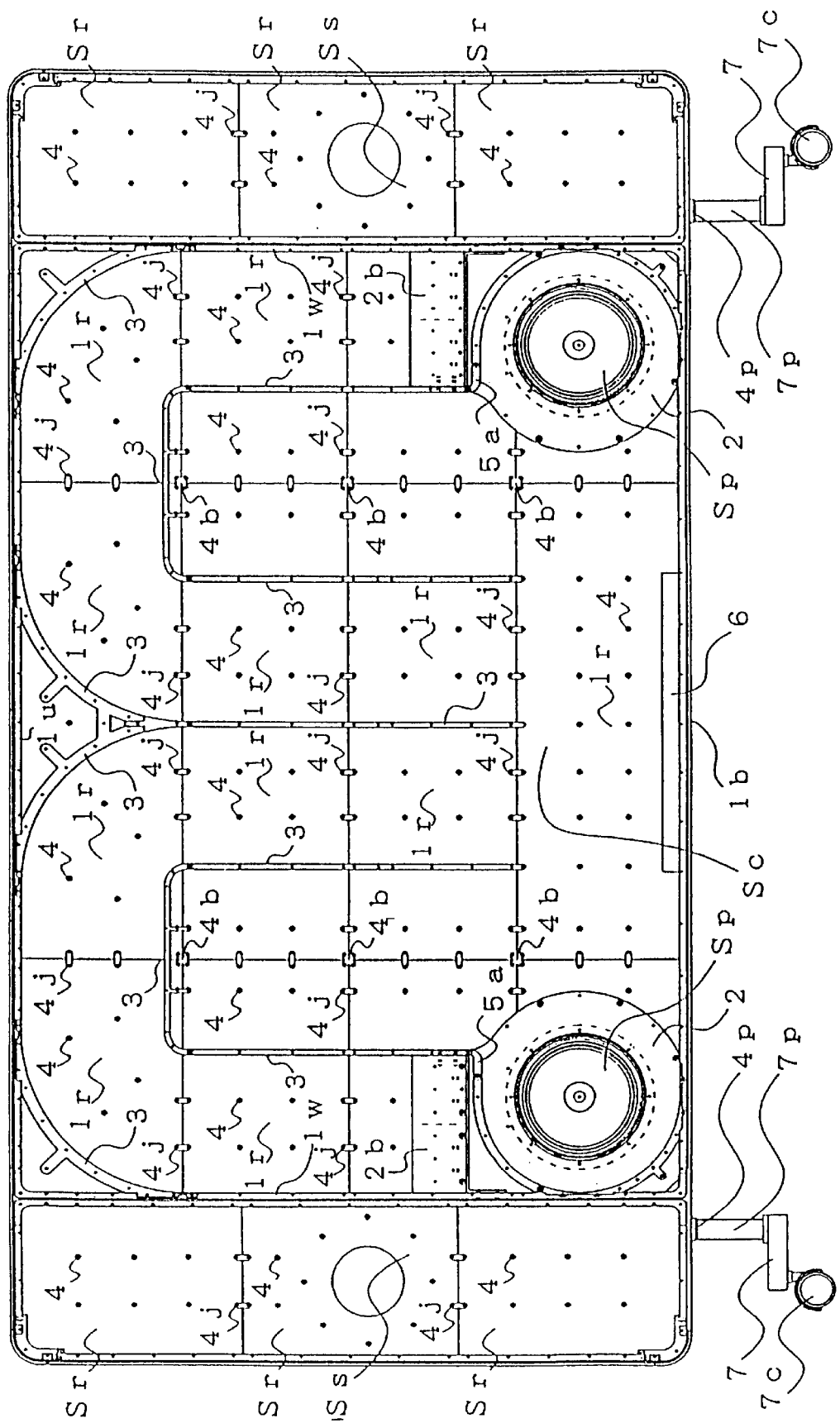
FIG. 3 is a front view of a screen speaker with the front plate and side baffles being dismounted.

As shown in FIGS. 1 to 3, a cabinet of a screen speaker is constituted by a screen housing Sc and side speaker housings Ss. The screen housing Sc has a screen 1 mounted thereon and having a width of 1022 mm and a height of 766 mm. The side speaker housings Ss are disposed on both sides of the screen 1 and have a width of 180 mm. The depth D of the cabinet is 30 mm. The total width of the cabinet is 1328 mm (inclusive of the widths of the side speaker housings Ss), and the diagonal length of the screen 1 is about 1382 mm or longer. This screen speaker has a screen size usually called a 50-inch size.

FIG. 3 is a front view of the screen speaker with a front panel 1c of the screen housing Sc and a side baffle sb of the side speaker housing Ss being dismounted. Ultra thin speakers sp proposed by the present inventors are disposed near the right and left bottoms of the screen housing Sc for mounting the screen 1.

Figure 4:
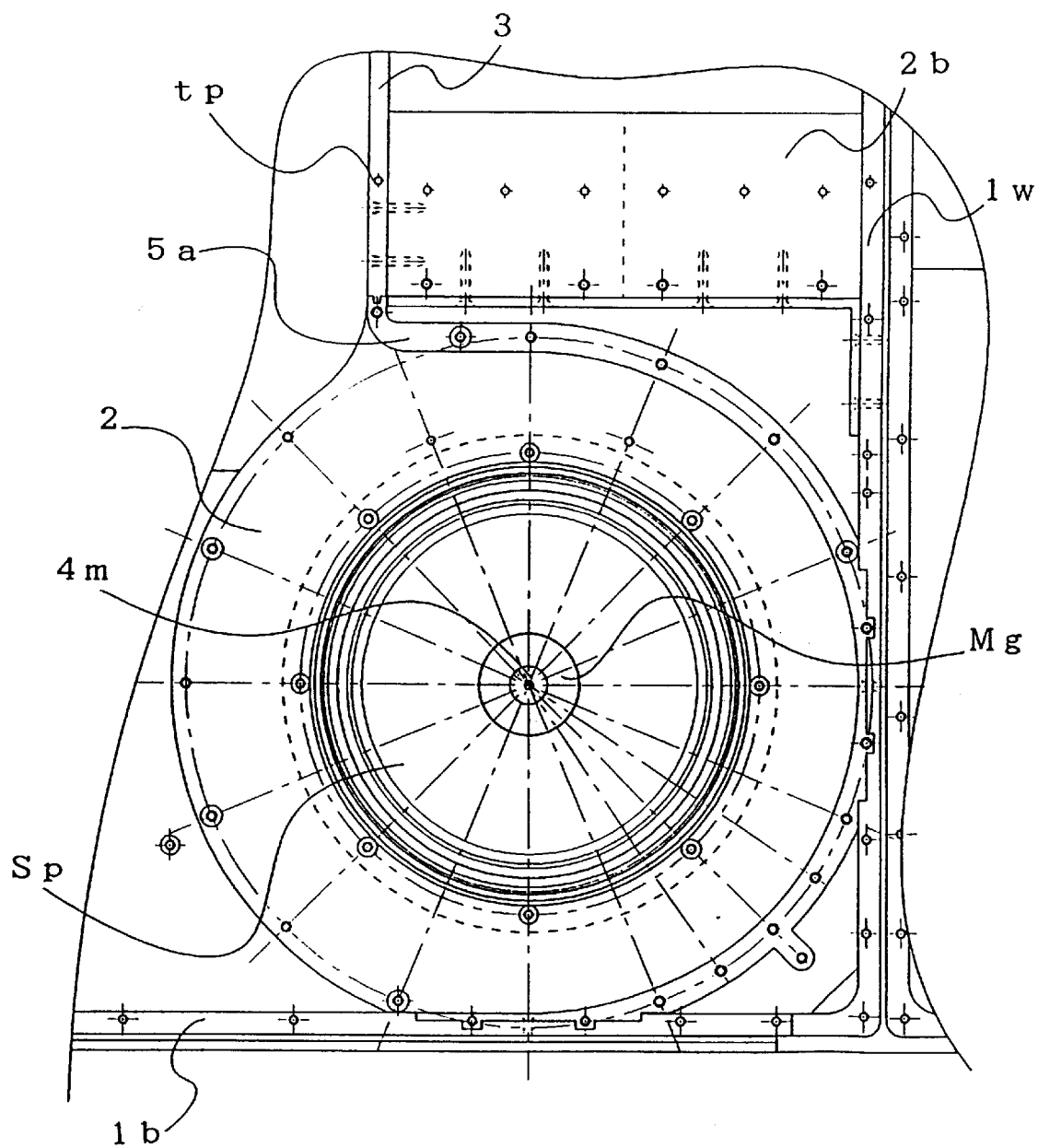
FIG. 4 is an enlarged front view showing the main part of the speaker mounted on a screen housing.

The structure of the speaker sp will be described in detail with reference to FIGS. 4 and 8. A baffle 2 made of brass is disposed at a mount position of the speaker sp, i.e., at the middle of a depth d at each of the right and left bottoms of the screen housing Sc. The baffle 2 has an opening of 132 mm in diameter. Countersinks are being formed in a rear plate 1r and a front plate 1s so as to mount a support shaft 4m for a magnetic circuit (hereinafter called a magnetic circuit support shaft) at the center of the opening.

The magnetic circuit support shaft 4m is made of a cylindrical brass having a diameter of 11.88 mm and a length of 24 mm. Tapped threads are formed in the central areas of the opposite ends of the magnetic circuit support shaft 4m. The magnetic circuit support shaft 4m is fixed to the front plate is by using a brass countersink screw of 3 mm * 12 mm and adhesive agent. A positioning jig J such as shown in FIG. 4 having an inner diameter of 11.9 mm and an outer diameter of 30.48 mm is inserted into the magnetic circuit support shaft 4m, and the central opening (having an inner diameter of 30.5 mm) of a voice coil of an already assembled diaphragm system Da is fitted around the jig J. In this state, a ring R adhered to the outer peripheral area of an edge e is fixed to the baffle 2 by using specific bolts sb and nuts sn.

The diaphragm system Da will be described with reference to FIGS. 6 and 7. A diaphragm df is made of two sub-diaphragms attached together as shown in the figures. Each sub-diaphragm is made of pulp and is very thin and of a conical shape. The outer diameter thereof is 112 mm, the inner diameter is 33.1 mm, and the height is 2.5 mm. The peripheral portion of the sub-diaphragm near the central opening is called a neck with a rising edge of about 2 mm. The diaphragm has therefore a cross section of a wedge shape. The thickness of the diaphragm on the neck side is about 5 mm. The thickness of the diaphragm is gradually thinned toward the outer periphery, and becomes about 0.6 mm at the outermost area. The inner space between the two sub-diaphragms attached together is being filled with pulp. The total weight of the diaphragm df is about 4 grams.

The edge e as a suspension is being attached to the outer peripheral portion of the diaphragm df. The material of the edge e is a woven cloth processed by filler. The edge e has a generally-called gathered edge shape. The total width of the gathered portion or corrugated portion of the edge e is about 17.5 mm, the number of corrugations is three, and the height of each corrugation is about 2.6 mm. The edge e has an attachment margin having a width of 6 mm on the inner side (on the diaphragm df side) and another attachment margin having a width of about 8 mm on the outer side (on the ring R side). The ring R made of phenol resin and having an inner diameter of 132 mm, an outer diameter of 150 mm, and a thickness of 2 mm, is attached to the attachment margin on the outer side of the edge by means of rubber-based adhesive agent.

The edge e is molded by general thermal molding. Prior to the molding process, a flat net-shaped tinsel wire hw is stitched on the surface of the edge e, and the molding process is performed so that the flat net-shaped tinsel wire hw is aligned along the center line of the diaphragm df on the flat surface of the edge e. Unnecessary flat net-shaped tinsel wire hw extending outside of the neck is trimmed, and the remaining flat net-shaped tinsel wire hw is adhered to the attachment margin and to the surface of the diaphragm df.

Figures 6A, 6B:
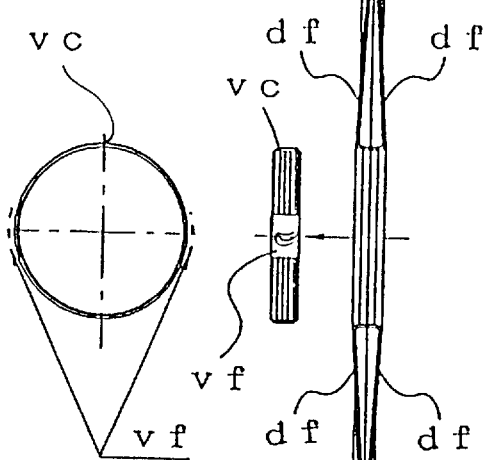
FIG. 6 is a cross sectional view of a speaker diaphragm system in a disassembled state to be mounted on the screen housing, and a plan view of a voice coil.
Figure 7A:
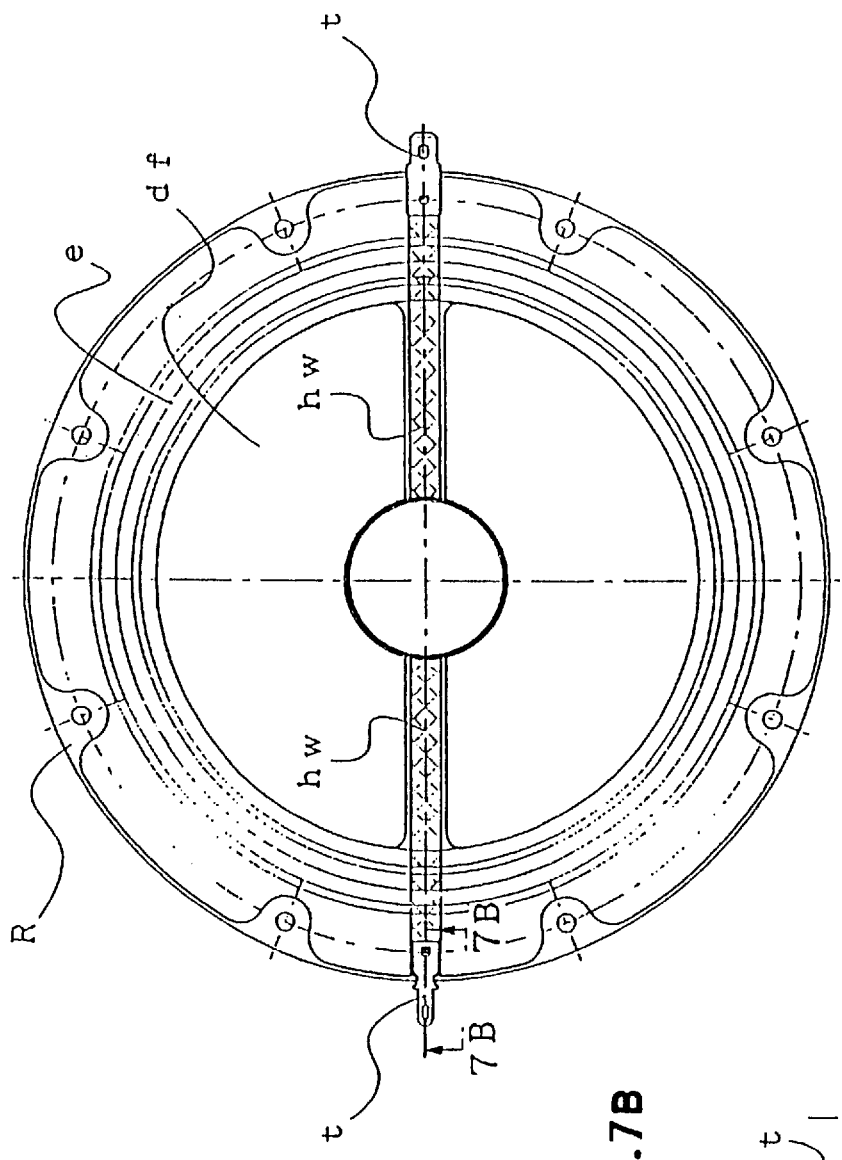
FIG. 7 is a plan view and a partial enlarged cross sectional view of the speaker diaphragm system mounted on the screen housing.
Figure 7B:
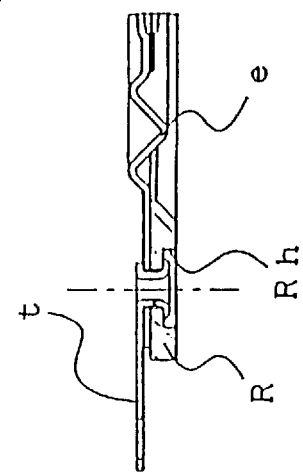

Therefore, as shown in FIGS. 6 and 7, the flat net-shaped tinsel wire hw is disposed on the right and left sides from the outermost periphery of the edge e, i.e., near from the central area of the ring R, to the neck along the center line of the diaphragm df. The flat net-shaped tinsel wire is made by the following manner. Para-aramid fibers of 200 denier are used as the center yarns of the flat net-shaped tinsel wire. A tin copper alloy foil having a width of 0.32 mm and a thickness of 0.027 mm is wound about the center yarns at a pitch of 22 turns/cm to form one layer of the tin copper alloy foil. Thirteen of these tinsel wires are woven together in a flat net-shaped configuration at a weaving pitch of about 27.45 mm/turn.

The voice coil vc has an inner diameter of 30.5 mm. The material of a bobbin is PPTA (poly-para-phenylene telephethal amide) film. A flat rectangular wire of copper clad aluminum is wound about the bobbin by a predetermined number of turns at a winding width of about 5 mm. A PPTA film having a width of 5 mm and a thickness of 12 microns is wound three to four layers on the outermost turn of the coil. Two copper foils vf are attached to the outermost turn of the film, the copper foils vf being disposed at a 180 degree interval as shown in FIG. 7 and each having a width of 5 mm, a length of 8 mm, and a thickness of 10 microns. The copper foils vf are being soldered to the winding start and end of the voice coil vc.

Adhesive agent is coated on a proper area of the outer peripheral surface of the voice coil vc. The voice coil vc is inserted into the central opening of the diaphragm df while aligning the ends of the flat net-shaped tinsel wires hw extending to the neck of the diaphragm df with the copper foils vf of the voice coil vc, so that the diaphragm df as adhered to the outer peripheral surface of the voice coil vc. The whole periphery of the neck is molded to have a desired chamfer so that the ends of the flat net-shaped tinsel wires hw can be easily contacted with the copper foils vf of the voice coil vc. After the contact areas are soldered together, adhesive agent a is coated on the chamfer as seen from the enlarged partial view shown in FIG. 10 in order to enhance the adhesive strength between the diaphragm df and the voice coil vc. Two holes Rh are formed in the ring R attached to the outer peripheral area of the edge e at predetermined positions, i.e., at the positions where the ends of the flat net-shaped tinsel wires hw extend to the outer peripheral area of the edge e. Input terminal lugs t shown in the figure are being coupled to the holes Rh by caulking.

Part of the terminal lug t is therefore made in tight contact with the end of the flat net-shaped tinsel wire hw to complete an electrical connection therebetween. As shown in the enlarged partial view of FIG. 7, since the caulking hole 1h is counter-bored at its bottom, the caulked terminal lug t and the baffle are not electrically shorted when the diaphragm system Da is mounted on the brass baffle 2. When the diaphragm system Da is mounted on the baffle 2, the center of the depth d of the cabinet is aligned with the center of the depth of the diaphragm system Da as shown in FIGS. 4, 5 and FIGS. 8 to 10. The diaphragm df is therefore disposed symmetrically with the centers, i.e., the front and back sides of the diaphragm df are disposed symmetrically as viewed from the front of the screen 1.

After the diaphragm system Da is fixedly mounted on the baffle 2, the magnetic circuit structure is fitted around the magnetic circuit support shaft 4m. In this embodiment, two magnets M1 and M2 used are neodymium-based magnets.

Each magnet is of a ring shape having an outer diameter of 29 mm, an inner diameter of 12 mm, and a thickness of 7 mm. The magnets M1 and M2 have been magnetized in the thickness direction. In this embodiment, in order to position the magnetic circuit structure in the central area of the cabinet, aluminum spacers ms having an outer diameter of 29 mm, an inner diameter of 12 mm, and a thickness of 3.25 mm are disposed, as shown in FIG. 9, on the outer sides of the magnets M1 and M2, i.e., on the front plate 1s side and the back plate 1r side.

Figure 8:
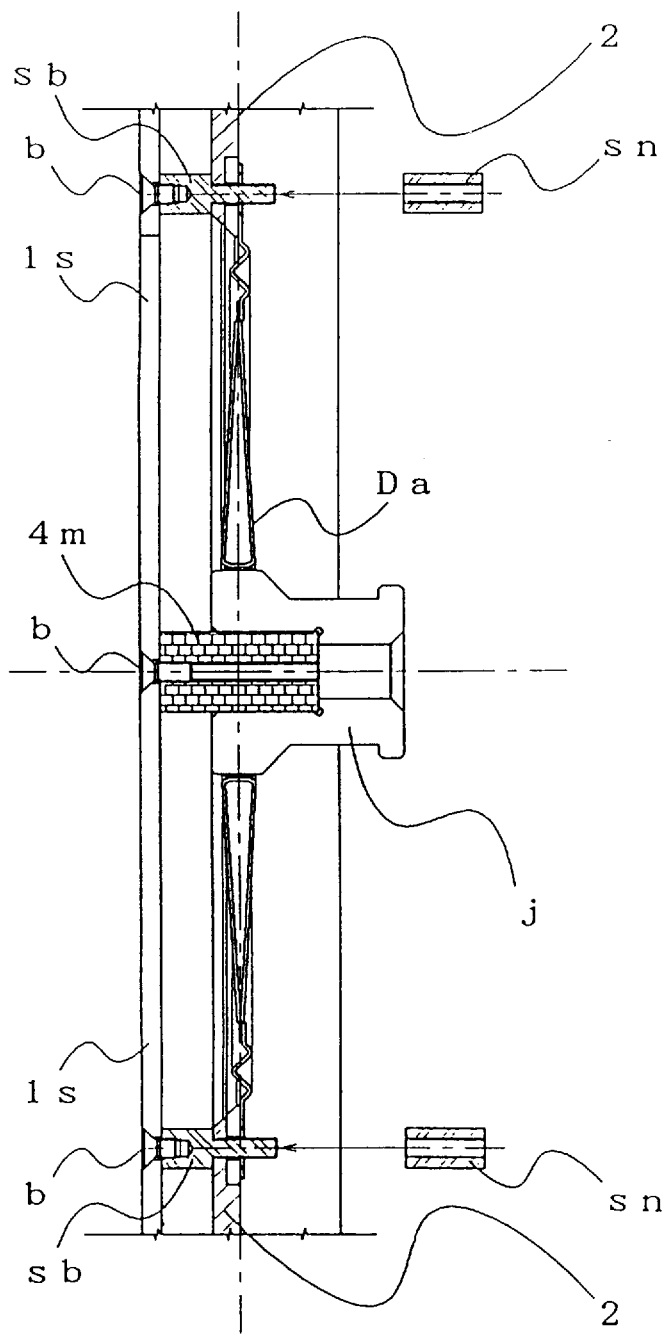
FIG. 8 is a cross sectional view showing the state of mounting the speaker diaphragm system and magnets between the front plate and a rear plate and explaining the mount sequence of the speaker diaphragm system.
Figure 9:
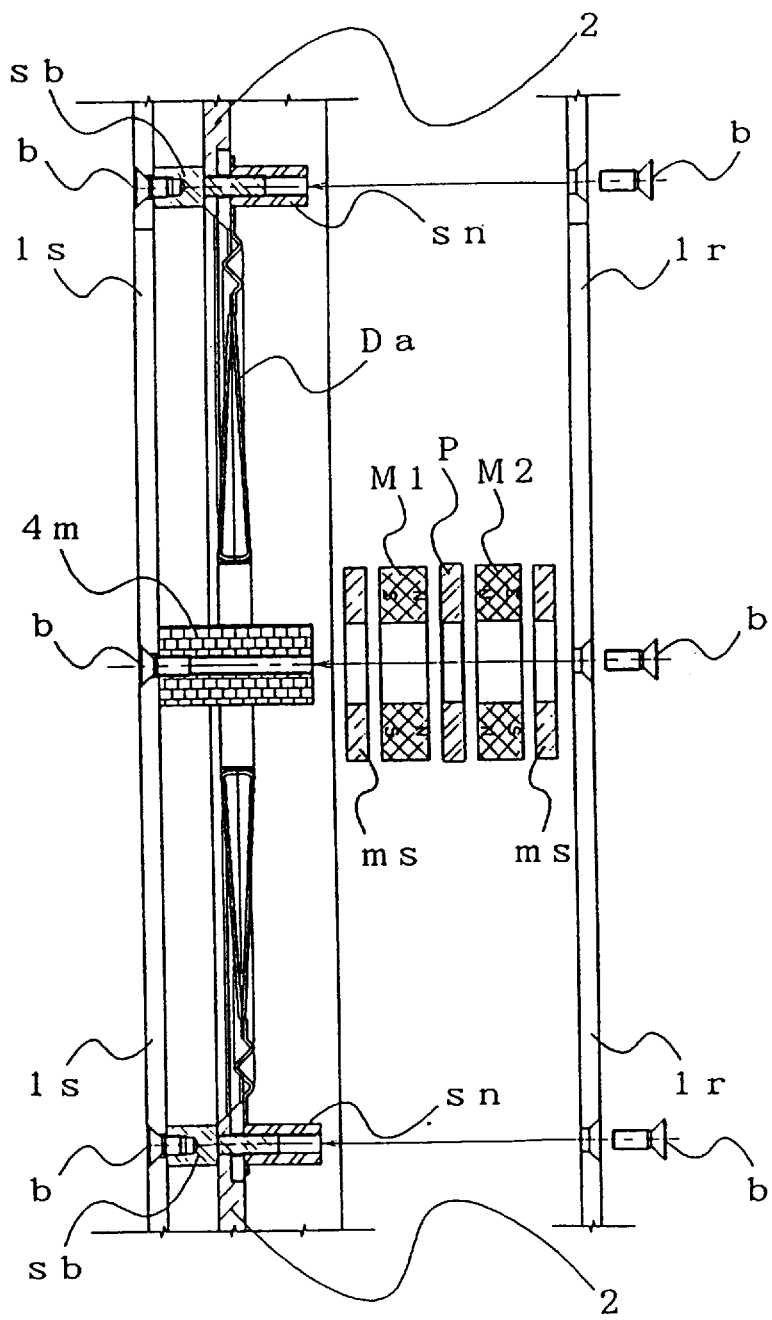
FIG. 9 is a cross sectional view explaining the mount sequence of a repulsion type magnetic circuit structure.

The mounting method of the magnetic circuit structure is illustrated in FIGS. 8 to 10. Adhesive agent is coated on the surface near the joint area between the front plate is and the magnetic circuit support shaft 4m. The hole of the spacer ms is fitted around the outer periphery of the magnetic circuit support shaft 4m. After a predetermined amount of adhesive agent is coated on the surface of the spacer ms, the hole of the magnet M2 is fitted around the outer periphery of the magnetic circuit support shaft 4m, with the N pole being directed to the right as viewed in the figure. After adhesive agent is coated on the surface of the magnet M2, a center plate P is fitted around the magnetic circuit support shaft 4m. The center plate P is made of iron and has a ring shape having an outer diameter of 29.95 mm, an inner diameter of 11.9 mm, and a thickness of 3.5 mm. The hole and its shoulders are provided with chamfers of C 0.4. The center plate P is pushed down to the position where the bottom surface of the center plate P becomes in tight contact with the N pole of the magnet M2.

After adhesive agent is coated on the surface of the center plate P, the hole of the magnet M1 is fitted around the magnetic circuit support shaft 4M with the N pole being directed to the left, and the magnet M1 is pushed down to the position where it becomes in tight contact with the surface of the center plate P. In this state, the same poles (N poles) of the magnets face each other, and the center plate P is securely sandwiched between the magnets. A predetermined amount of magnetic fluid is filled in a gap between the center plate P and the voice coil bobbin. Input lead wires are electrically connected to the input terminal lugs t. Thereafter, a spacer ms is fitted around the magnetic circuit support shaft 4m, and as shown in FIGS. 9 and 10, the front plate 1s is mounted on the cabinet by using countersink screws D to complete the magnetic circuit structure sandwiched between the rear plate 1r and a front plate is.

Figure 11:
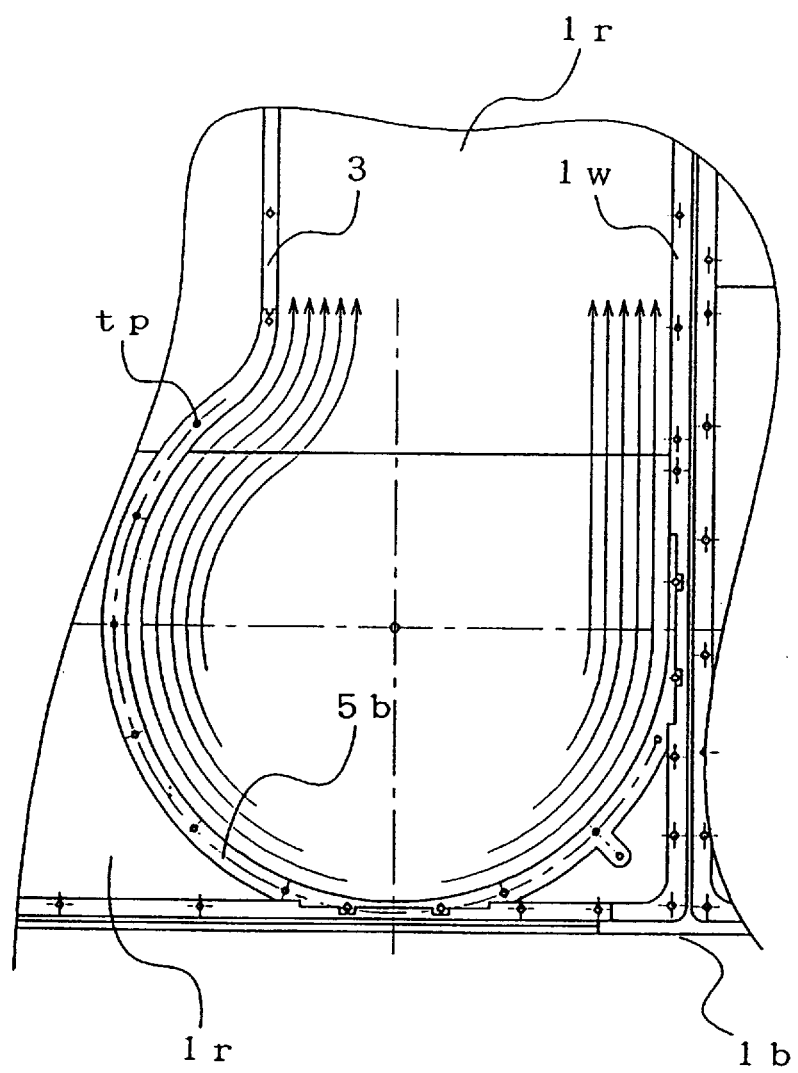
FIG. 11 is a front view showing the structure of sound paths and the relationship between the rear plate, sound path constituting plate, and partition plates.
Figure 12:
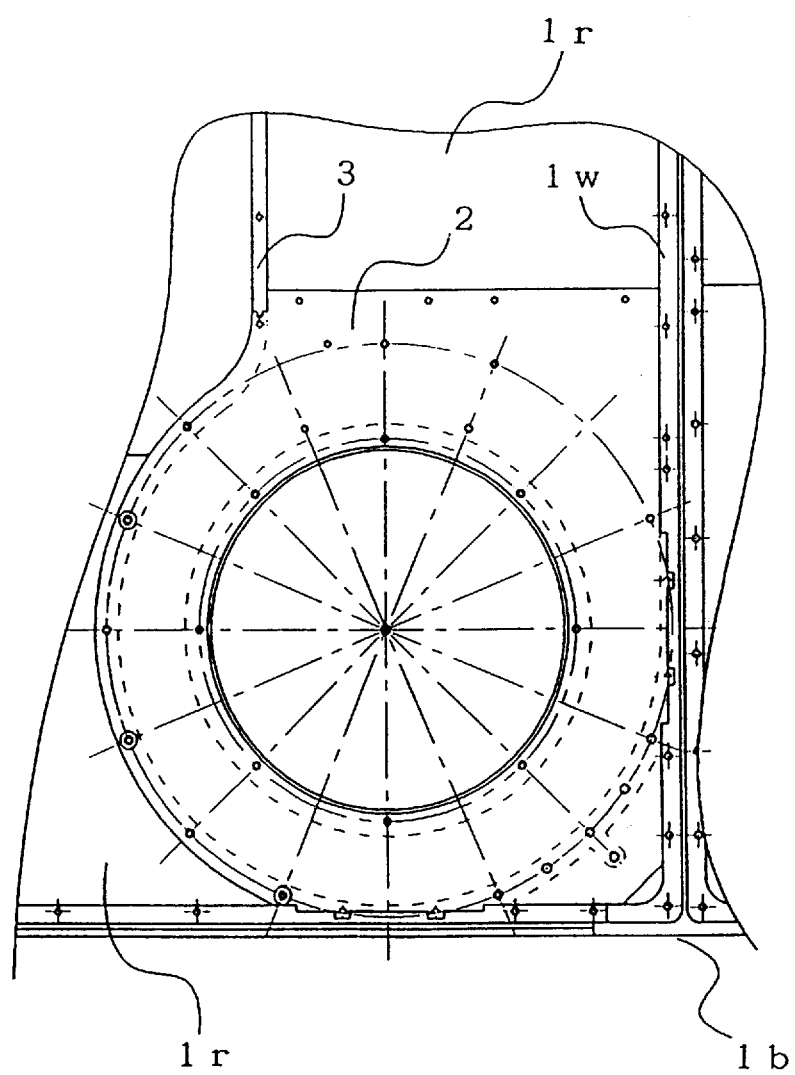
FIG. 12 is a front view showing the main part of the mount state of a baffle.
Figure 13:
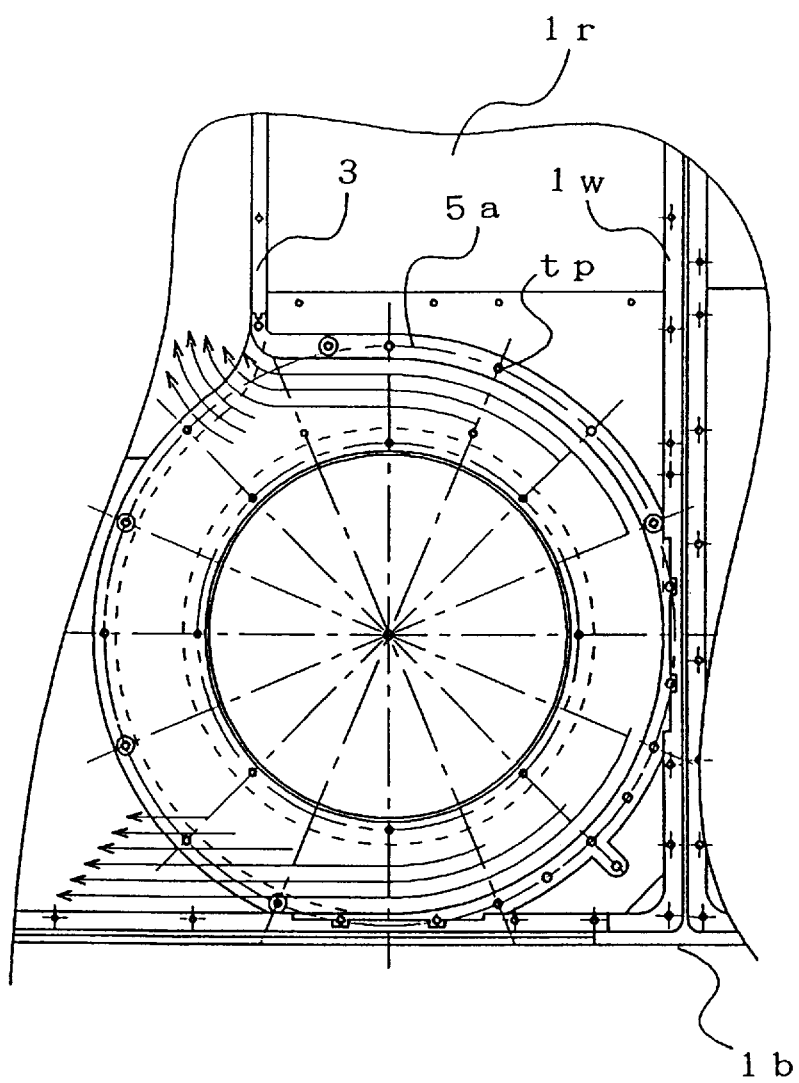
FIG. 13 is a front view showing a sound path of sounds radiated from the front side of a diaphragm.

As shown in FIGS. 11 to 13, the baffle 2 is joined with aluminum partition plates 5a and 5b on the front and back sides of the baffle 2. Specifically, as shown in FIG. 12, the baffle 2 is placed on the partition plate 5b shown in FIG. 11. That is to say, the partition plate 5b shown in FIG. 12 is disposed on the back side of the baffle 2 and is depicted by broken lines in FIGS. 12 and 13. The other partition plate 5a is disposed on the front side of the baffle 2 as indicated by the solid line in FIG. 13.

Therefore, sounds generated on the back side of the baffle 2 (sounds on the back plate 1r side of the baffle 2) propagate in the direction indicated by arrows in FIG. 11 and are guided to a sound path. The sound path is defined by a sound path constituting plate 3 sandwiched between the front plate 1s and rear plate 1r. This plate 3 is made of an aluminum plate having a thickness of 6 mm and a width of 24 mm. The width of the sound path is about 150 mm.

Figure 5:
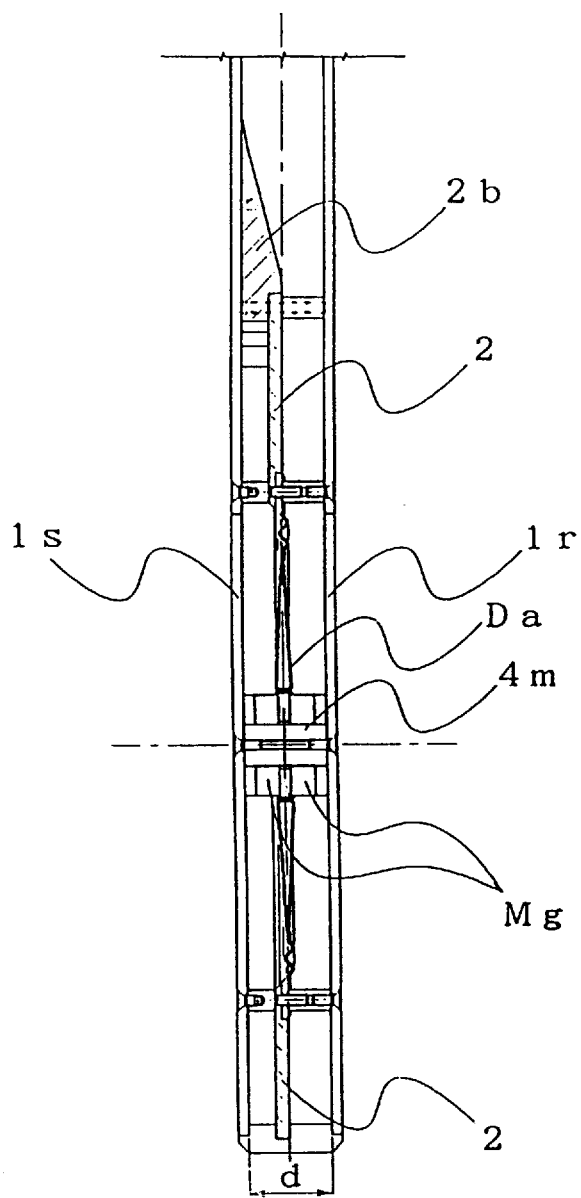
FIG. 5 is a side view in section of the speaker mounted on the screen housing.

The length of the sound path is determined in accordance with design objects. In this embodiment, as shown in FIG. 3, the sound paths each are of an inverted U-character shape and are disposed symmetrically to the right and left. Specifically, the sound paths extend upward from the right and left speakers sp along right and left side plates 1w, extend horizontally along a top plate 1u, change the directions inward (toward the central area of the cabinet), and extend downward (toward a bottom plate 1b) along the cabinet center line, to thereby provide predetermined lengths of the sound paths. As shown in FIGS. 4 and 5, a slanted block 2b is provided at the upper portion of the baffle 2 in order to smoothly guide sounds on the rear plate 1r side to the sound path.

Sounds generated on the front side of the baffle 2 (sounds on the front plate 1s side of the baffle 2) propagate in the direction indicated by arrows in FIG. 13 (toward the left side as viewed in the figure) and are guided to a cavity. The cavity is formed at the space opposite to the sound path defined by the sound path constituting plate 3. In this embodiment, the sound path constituting plate 3 extending along the center line of the cabinet is not connected to the bottom plate 1b. Therefore, the cavities on the baffle front side of the right and left speakers sp are communicated with each other. An elongated opening of 10 mm * 300 mm is formed in the bottom plate 1b as shown in the bottom view of FIG. 2A to provide a duct 6 having a length of 30 mm. In this embodiment, therefore, as the right and left speakers sp are applied with stereo signals, sounds generated by the diaphragm df on the rear plate 1r side of the baffle 2 are guided to the sound paths, whereas sounds generated by the diaphragm df on the front plate 1s side of the baffle 2 are guided to the cavities. Sounds from the right and left sound paths and cavities are combined together which are transmitted via the duct 6 to the outside of the cabinet.

The structure near the mount area of the speaker sp will be described further with reference to FIGS. 11 and 12. Tapped threads tp of 3 mm are formed in the partition plates 5a and 5b and sound path constituting plates 3 in the plate thickness direction (in a generally-called "kiguchi" portion in Japanese) at predetermined positions. Countersink holes 1h of 3 mm are formed in the rear and front plates 1r and 1s at positions corresponding to the tapped threads. The partition plates 5a and 5b and sound path constituting plates 3 are securely interposed between the rear and front plates by using countersink screws b. Therefore, the partition plates 5a and 5b and sound path constituting plates 3, particularly, the latter, function as reinforcing ribs. The mount state is shown in FIG. 23. The front and rear plates 1s and 1r each having a thickness of 3 mm are cut in predetermined lengths in advance and the countersink holes 1h of 3 mm are formed.

The material of the front and rear plates 1s and 1r may be aluminum, brass, stainless steel, phenol, acrylic resin, vinyl chloride, wood or the like. The front and rear plates 1s and 1r are mounted by mainly countersink screws of 3 mm * 12 mm and by adhesive agent. For example, the front and rear plates 1s and 1r are made of stainless steel at the back side portion of the speakers sp at the lower right and left portions of the screen housing Sc, and of brass on the front side portion thereof, of aluminum, brass or the like at the central portion defining the sound paths and cavities, of resin such as acrylic resin and vinyl chloride at the upper portion of the screen housing Sc, and of wood, acrylic resin, or the like at the portion defining the lower areas of the cavities of the screen housing Sc. Therefore, the front and rear plates 1s and 1r of the screen housing Sc are constituted by plates of different materials disposed in mosaic, and also by plates of different materials at the same portion of each plate.

In this embodiment, in order to further increase the strength of the screen housing Sc, shafts 4 are interposed between the rear and front plates 1r and 1s at a predetermined positions shown in FIG. 3, the mount state being shown in FIG. 22. Each shaft 4 of a circular cylinder has a diameter of 6 mm and a length of 24 mm, and is tapped to form threads of 3 mm along the central axis thereof.

Figure 22A:
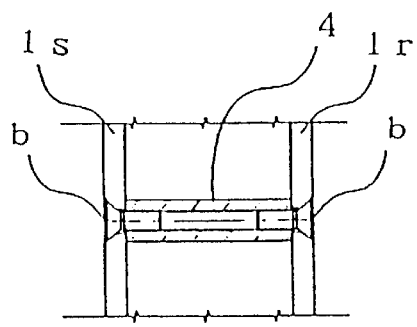
FIGS. 22A to 22c show a joint state between the front plate and the rear plate by a joint member.
Figure 22D:
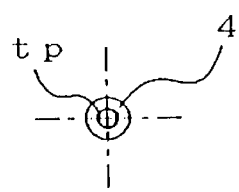
FIGS. 22D–22F show side views corresponding to FIGS. 22A–22C.
Figure 22B:
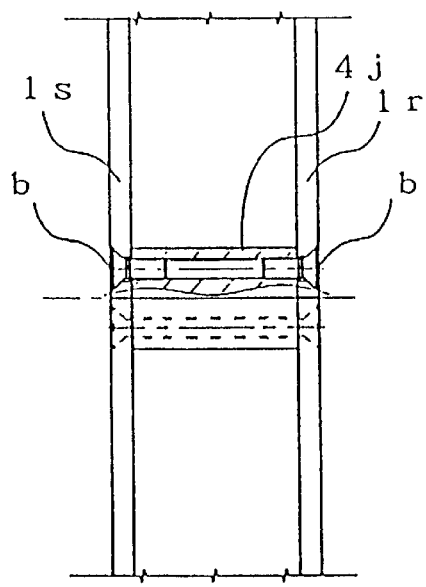
Figure 22E:
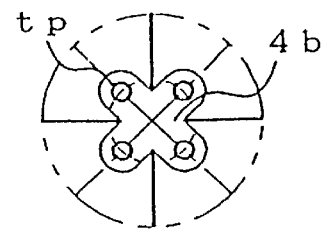
Figure 22C:
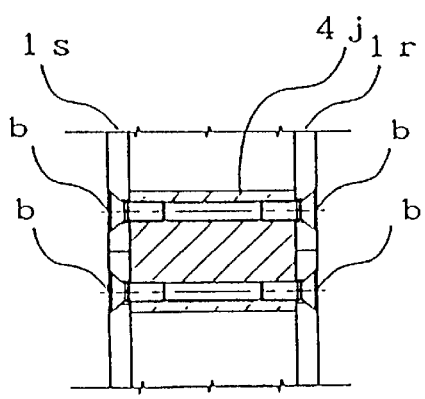
Figure 22F:
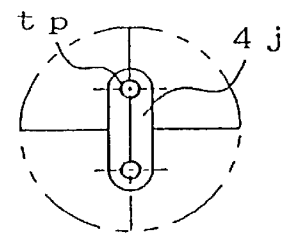

As shown in FIGS. 22B and 22C, pieces of the rear plate 1r and pieces of the front plate 1s are joined together by using joint plates 4j with two tapped threads and joint blocks 4b with four tapped threads. Similar to the shafts 4, the joint plates and blocks sandwiched between the rear and front plates 1r and 1s are fixed by using countersink screws b of 3 mm * 12 mm and adhesive agent, and the "kiguchi" portions of the rear and front plates 1r and 1s are also coupled together by adhesive agent.

Although not shown, in this embodiment, in order to improve the sound quality, lead plates each having an area of 50 mm * 50 mm and a thickness of 1 mm are attached to the inner surfaces of the rear and front plates 1r and 1s at proper positions by using adhesive agent.

After network components, sound absorbers, and the like are set to predetermined positions, the rear and front plates 1r and 1s are mounted on the housings. In order to planarize the uneven surfaces of the rear and front plates 1r and 1s caused by joints and screws, the surfaces of the rear and front plates 1r and 1s are coated with putty, surfacer, or the like to polish the surfaces. Thereafter, a sticky tape is attached to the surfaces, a vinyl chloride sheet of 0.3 mm thick is adhered to the whole surface of the rear plate 1r, and a screen sheet 1m is adhered to the whole surface of the front plate 1s. In this embodiment, the screen sheet 1 m is a lamination of three layers which is formed by attaching an aluminum foil on the surface of a polyester film and attaching a mat-finished polyester film to the surface of the aluminum foil.

The side speaker housing Ss integrally formed on each side of the screen housing Sc will be described. The depth D of the side speaker housing Ss is 30 mm same as the screen housing Sc. The side baffle Sb flush with the front plate 1s is structured in the same manner as the screen housing Sc. Specifically, the material of the side baffle Sb is selected from those materials same as the screen housing Sc, and the side baffle plate having a thickness of 3 mm is cut into a predetermined size and assembled in the same manner as the screen housing Sc by forming mount countersink holes 1h (3 mm in this embodiment) at predetermined positions. In this embodiment, the side baffle Sb is a brass plate at the portion where the speaker sp is mounted, and a wood plate at the portion lower or higher than the brass plate.

The rear plate of the side speaker housing Ss (hereinafter called a side rear plate sr) has also the same structure as the screen housing Sc. The side rear plate sr is an aluminum plate on the rear side of the speaker sp and a wool plate and a resin plate at the portion lower or higher than the aluminum plate. The side baffle is mounted at a predetermined position by using both countersink screws of 3 mm and adhesive agent, and as shown in FIG. 3 shafts 4 same as those used for the screen housing Sc are mounted on the inner surface of the side baffle at predetermined positions by using both countersink screws of 3 mm and adhesive agent. After a putty process and polishing process of the surface of the side baffle Sb, the surface is painted.

Figure 18:
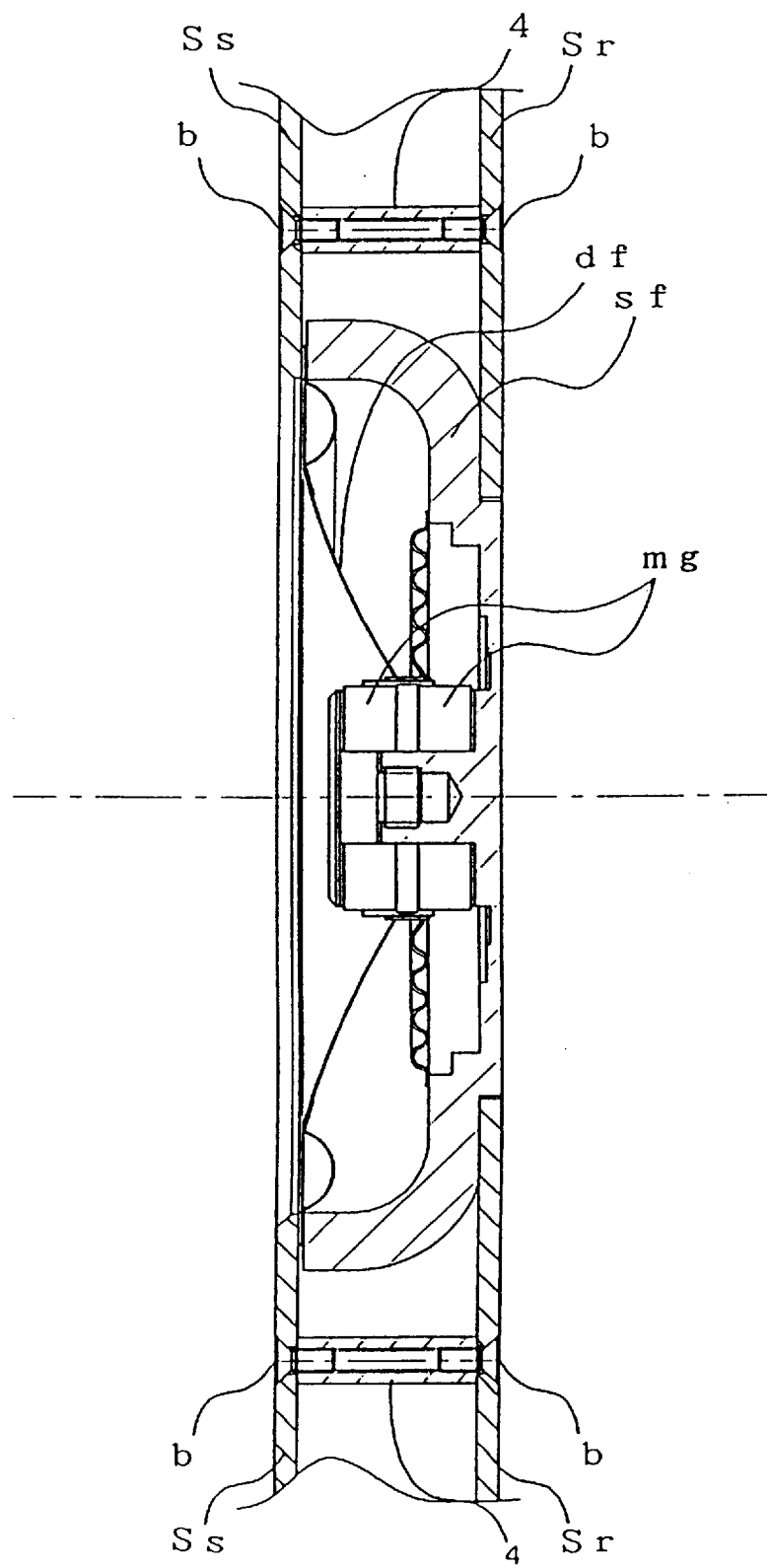
FIG. 18 is a cross sectional view of a speaker mounted on a side speaker housing.

The speaker sp of the side speaker housing Ss will be described with reference to FIG. 18. This speaker sp has a magnetic circuit similar to that of the ultra thin speaker sp disposed in the screen housing Sc. The inner diameter of the voice coil vc is 30.5 mm same as that of the screen housing Sc and the winding width thereof is about 7 mm, the other structure being the same as the ultra thin speaker sp of the screen housing Sc. A diaphragm df and a damper are mounted on the outer periphery of the voice coil. The diaphragm df is made of a cone paper sheet having a neck diameter of 31.5 mm, an outer diameter of 88 mm, and a depth of 12.5 mm, the cone paper sheet being formed with a roll edge e having an outer diameter of 110 mm. The damper has a flat net-shaped tinsel wire hw sewn along corrugations. The speaker of this structure is one example of speakers proposed by the present inventors as suitable for thin speakers.

Figure 19:
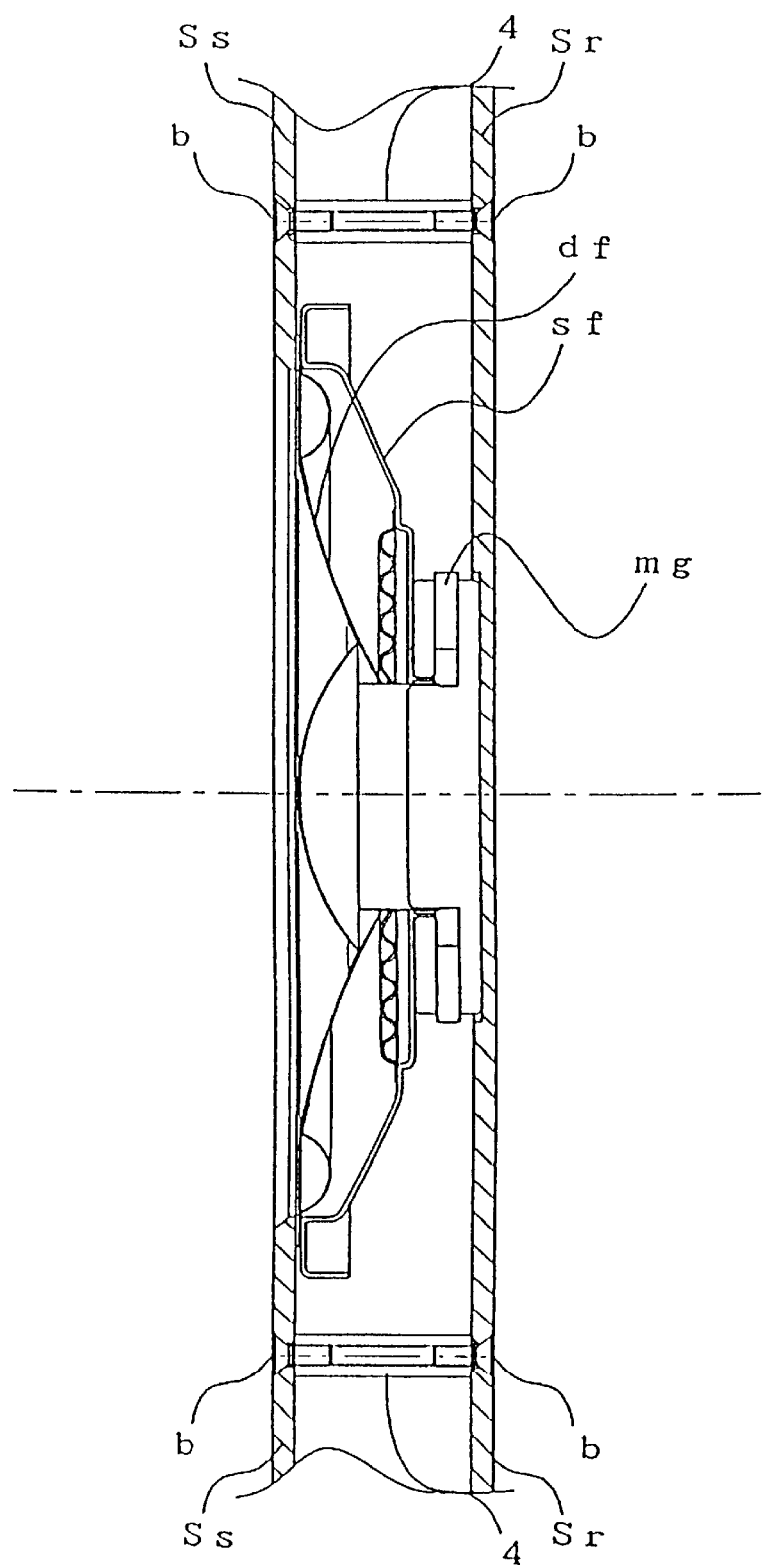
FIG. 19 is a cross sectional view of another speaker mounted on the side speaker housing.

After the speaker sp is fixed to the inner surface of the side baffle Sb, the side rear plate sr is fixed to the side wall. The speaker sp is therefore securely interposed between the inner surface of the side rear plate sr and the inner surface of the side baffle Sb. In this embodiment, the depth of a frame sf becomes essentially large in order to ensure a stroke of 13 mm of the diaphragm system Da and obtain a particular function of the speaker sp. Therefore, as shown in FIG. 18, the bottom of the frame sf exposes from the side rear plate sr and the bottom of the frame sf is designed to be flush with the outer surface of the side rear plate sr. If it is sufficient that a speaker has a depth and stroke of the diaphragm df not so large, the frame sf can be housed inside of the side rear plate sr. Also in the case of a general outer magnet type magnetic circuit, the speaker can be structured to be securely interposed between the inner surface of the side baffle Sb and the inner surface of the side rear plate sr as shown in FIG. 19. If it is designed so that the depth of a cone paper sheet is made shallow, the amplitude of the diaphragm df is made small, and the magnetic circuit By is made so thin as to be accommodated within the cabinet by using a neodium magnet or the like.

As shown in FIG. 1, the screen speaker is supported by cabinet support columns 4p fixed to the bottom plate 1b at predetermined positions. The cabinet support column 4 has a diameter of 16 mm and a length of 80 mm. A support leg 7 is coupled to the cabinet support column 4p.

Figure 14:
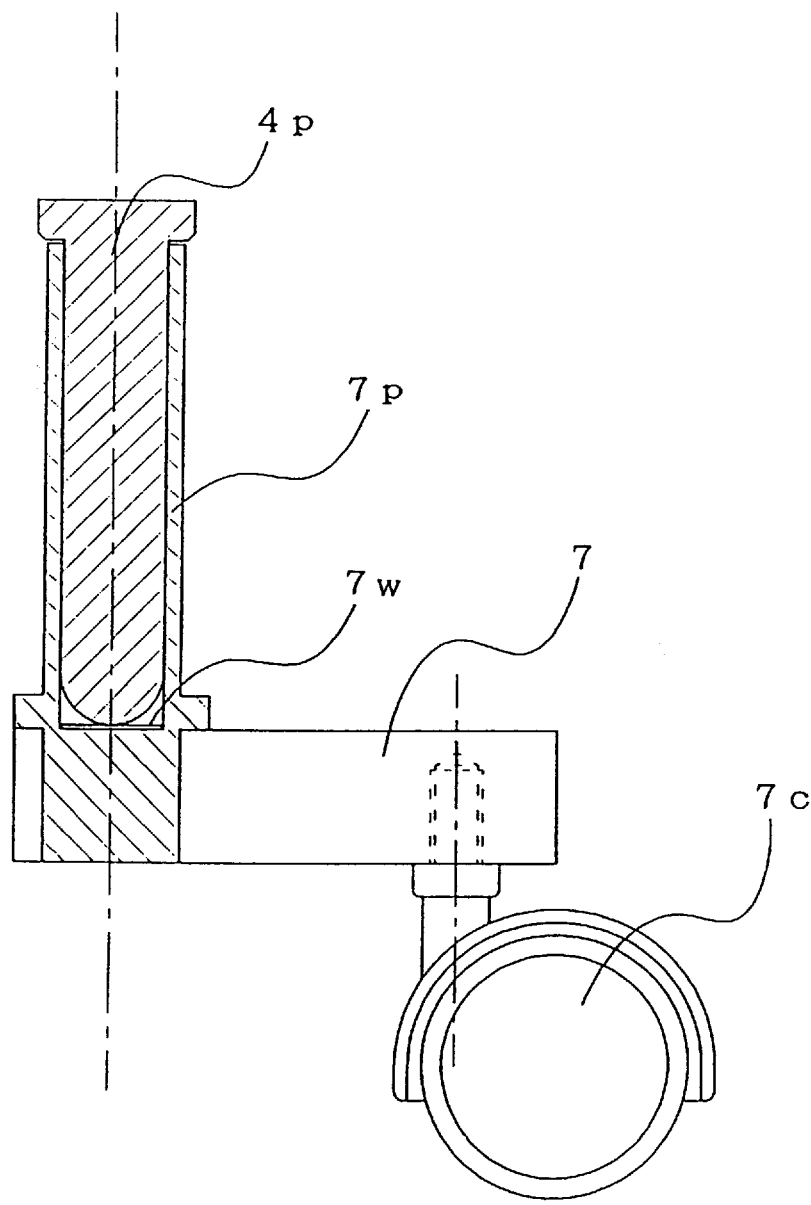
FIG. 14 is a side view partially in section showing a support leg of the speaker system.
Figure 15:
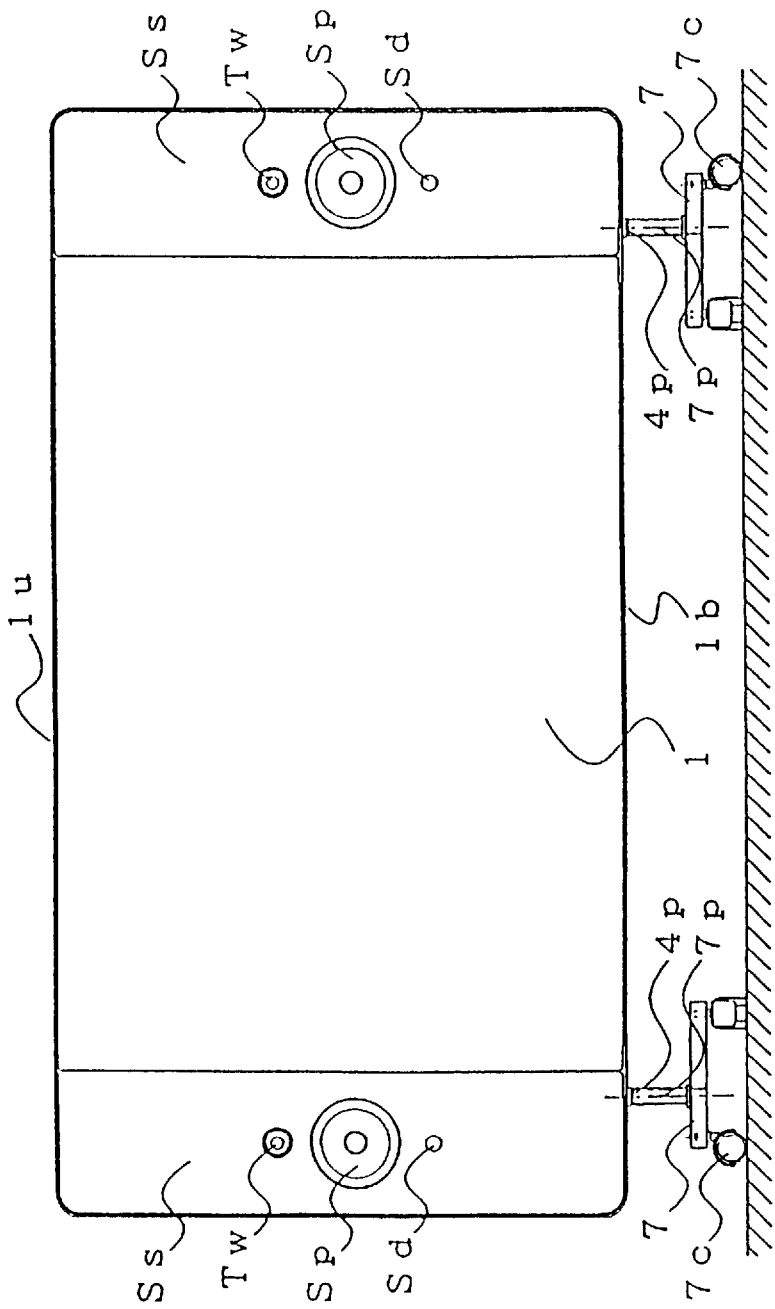
FIG. 15 is a front view showing the installation state of the screen speaker near a wall.

This support leg 7 is made of wood and has a shape of < as shown in FIG. 2A. One side has a length of 220 mm, a thickness of 20 mm, and a width of 30 mm. The opening angle of < is 120 degrees. As shown in FIG. 14, a support pipe 7p for supporting the cabinet support column 4p is formed at the center of the < support leg 7, and casters 7c are mounted on both the ends of the < support leg 7. The support pipe 7p is made of metal and has an inner diameter of 16.05 mm, an outer diameter of 21 mm, and a length of 80 mm. An iron plate 7w is disposed on the inside bottom of the support pipe 7p, the iron plate having a thickness of 0.7 mm and a diameter of 15.5 mm on which the semisphere portion formed by rounding the end of the cabinet support column 4p by 9 mm is received.

Figure 16A:
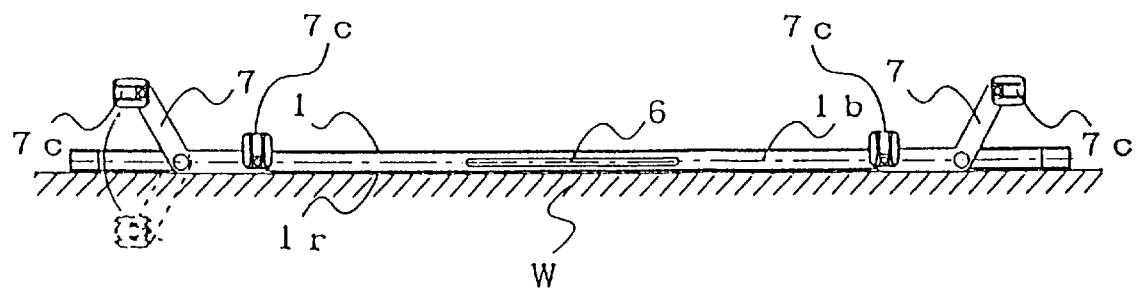
FIGS. 16A and 16B are a bottom view and a side view showing the installation state of the screen speaker near the wall.
Figure 16B:
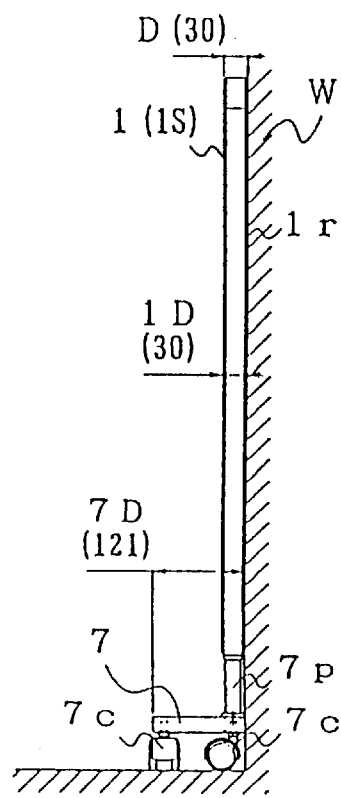
Figure 17A:
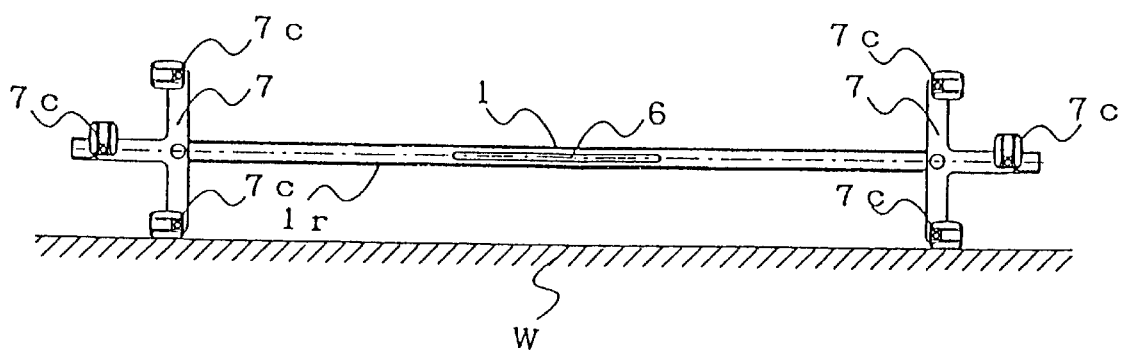
FIGS. 17A and 17B show other structures of a support leg.
Figure 17B:
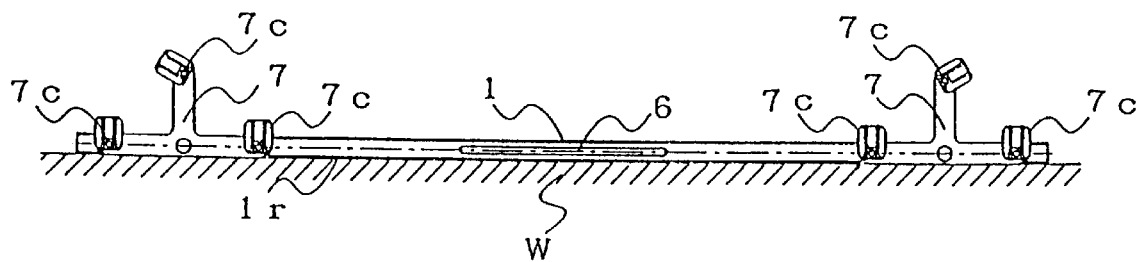

With this structure, therefore, the contact area between the semisphere portion of the cabinet support column 4p and the iron plate 7w becomes extremely small and the support leg 7 can be easily rotated. In ordinary installation of the screen speaker, both the sides of the < support leg are extended toward the back and front of the screen speaker (on the front plate 1s side and on the rear plate 1r side) as shown in FIG. 1. In installing the screen speaker in tight contact with a wall W, as shown in FIG. 16, the support leg 7 is rotated to position one side of the < support leg on the rear plate 1r side (on the wall W side) just under the bottom plate 1b.

Input terminals for the screen speaker of this embodiment are provided at the side plate of the side speaker housing Ss although they are not shown. A tweeter Tw and a duct Sd in addition to the speaker sp are disposed at the side speaker housing Ss. Stereo sounds are combined and radiated from the central area of the bottom plate 1b so that a final system is configured as a 3-D type 3-way speaker system.

Figure 24:
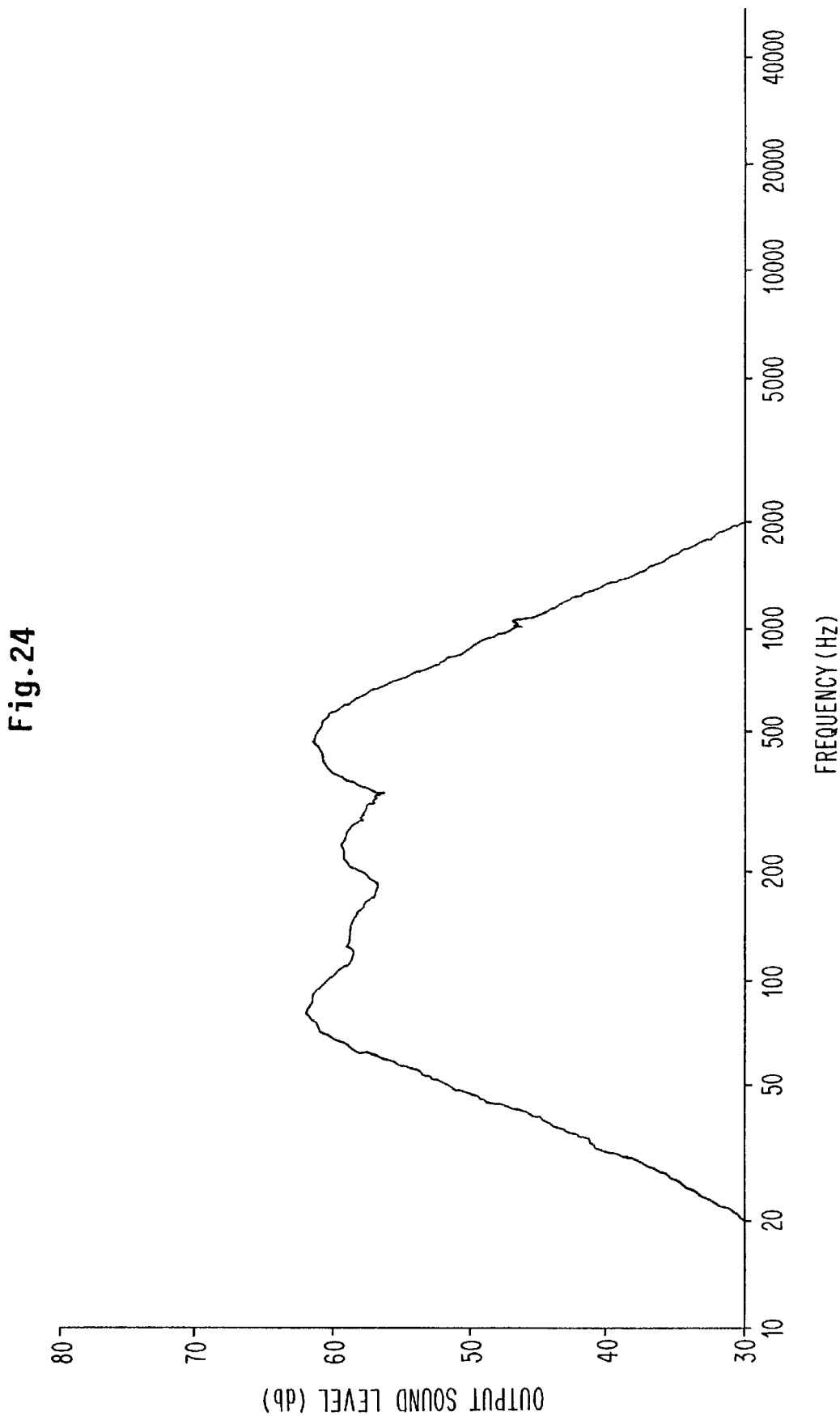
FIG. 24 is a graph showing the frequency characteristics of the screen housing.
Figure 25:
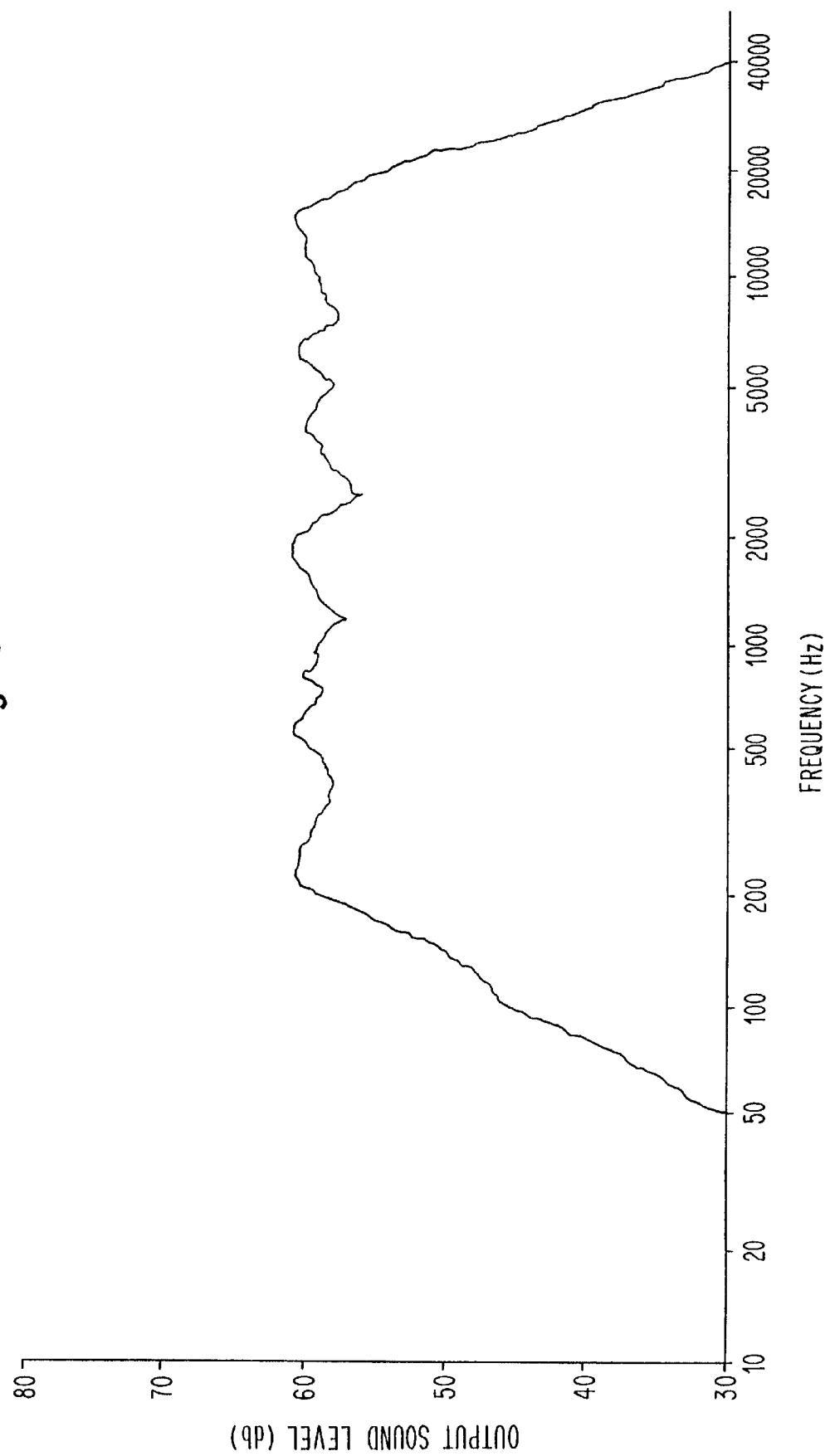
FIG. 25 is a graph showing the frequency characteristics of the side speaker housing.
Figure 26:
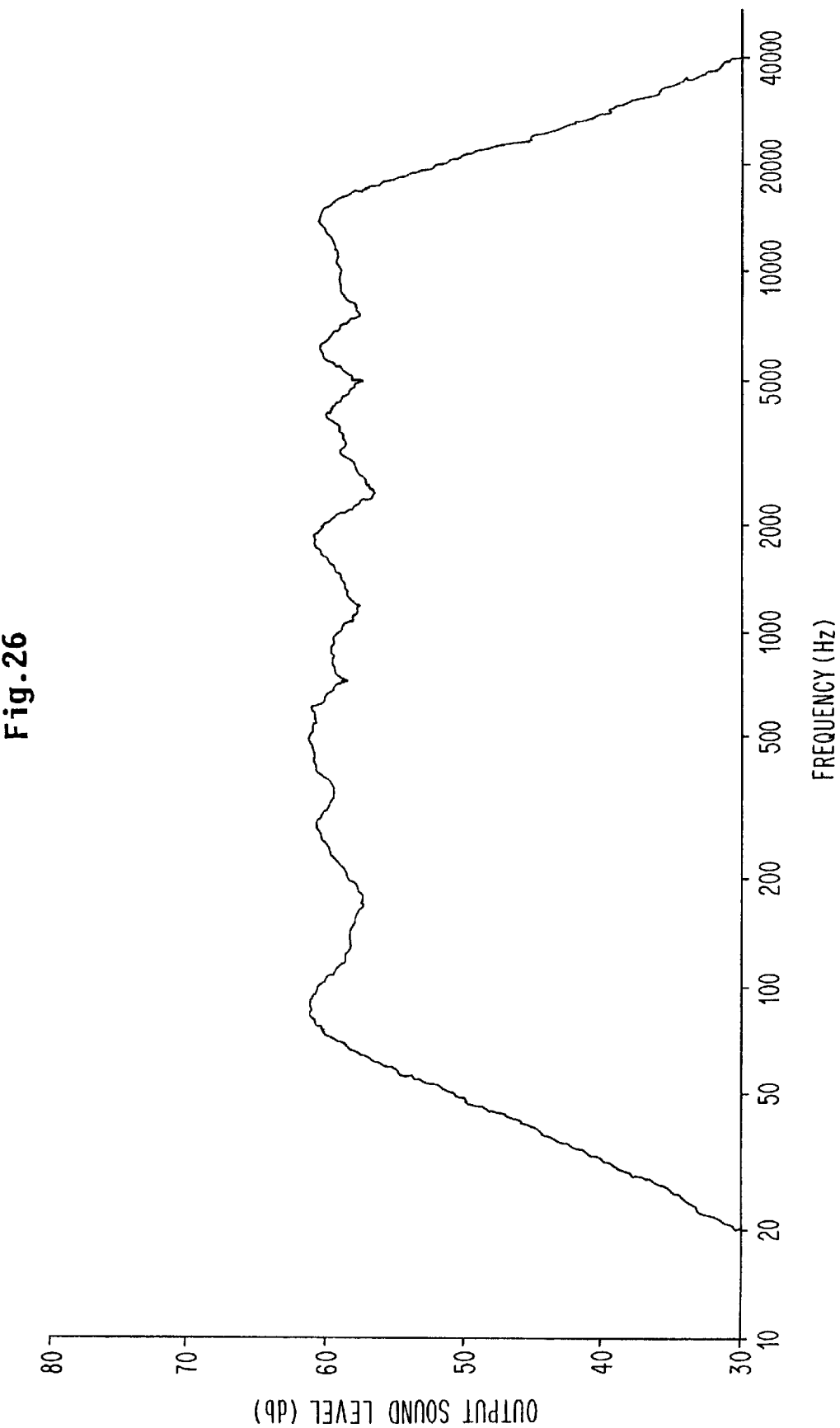
FIG. 26 is a graph showing the frequency characteristics of both the screen housing and side speaker housing.

FIG. 24 is a graph showing the frequency characteristics of the screen housing Sc which indicate that a band of necessary low frequency sounds is preserved. FIG. 25 is a graph showing the frequency characteristics of the side speaker housing Ss which indicate reproduction of middle and high frequency sounds. FIG. 26 is a graph showing the frequency characteristics of both the screen housing Sc and side speaker housing Ss which were measured by providing the embodiment screen speaker with network components of the system at predetermined positions and interconnecting them. The graph of FIG. 26 shows that sounds in an audio band are uniformly reproduced. It has been confirmed that the screen speaker system is practically sufficient and poses no problem of video images even if 50-inch video images are projected by a projector on the screen of the screen housing Sc while reproducing audio sounds from the screen speakers sp synchronously with the video images.

Figure 27:
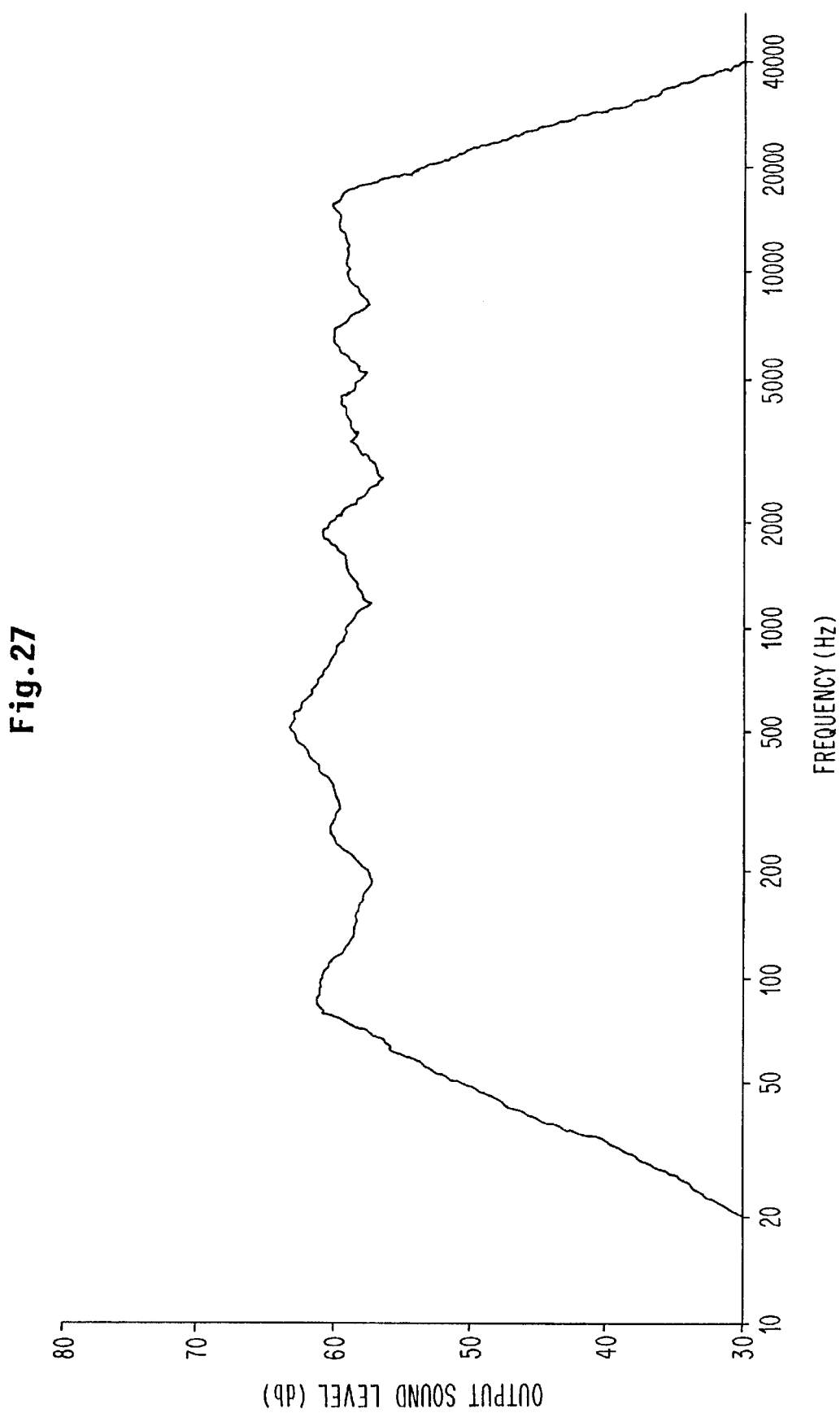
FIG. 27 is a graph showing the frequency characteristics obtained when the front plate is resonated.
Figure 28A:
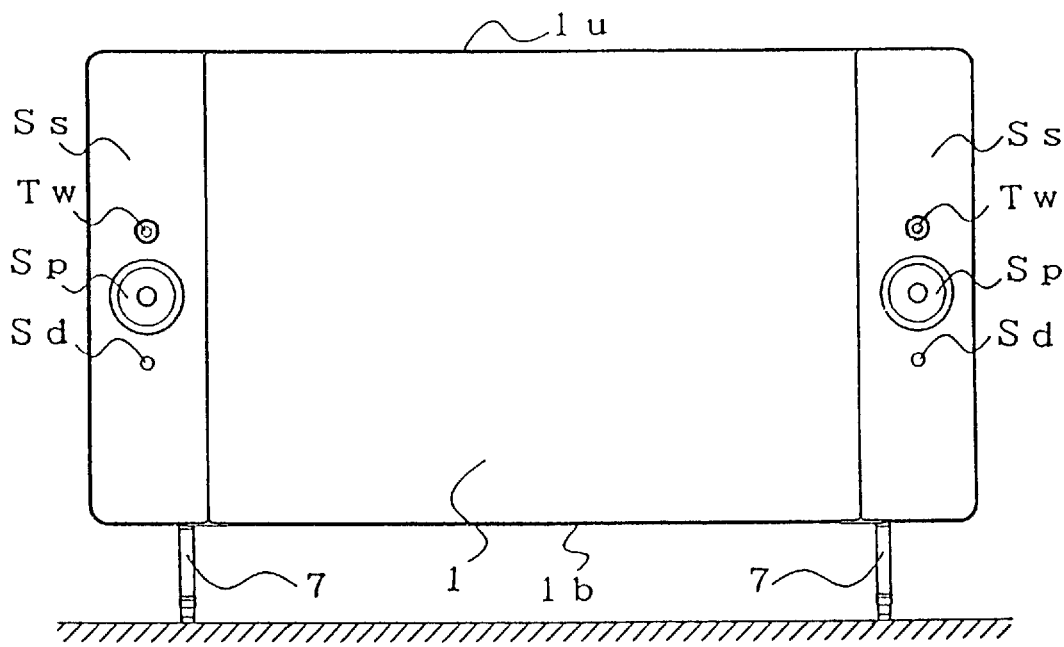
FIGS. 28A and 28B are a front view and a side view briefly showing a conventional screen speaker and its support legs.
Figure 28B:
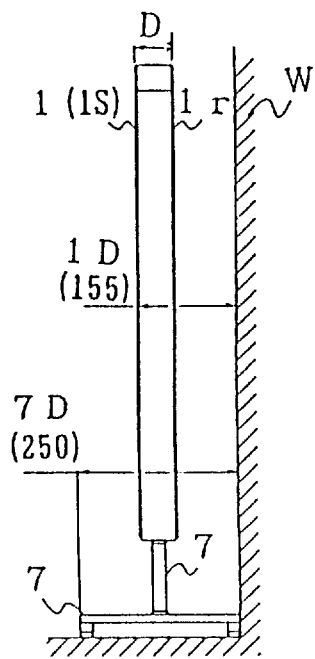

FIG. 27 is a graph showing the frequency characteristics wherein the front plate 1s is adapted to be resonated at sound pressures of 400 to 600 Hz generated by the ultra thin speakers in the screen housing Sc. With the increased sound pressure of this band, clarity of sounds is improved.

Figure 20:
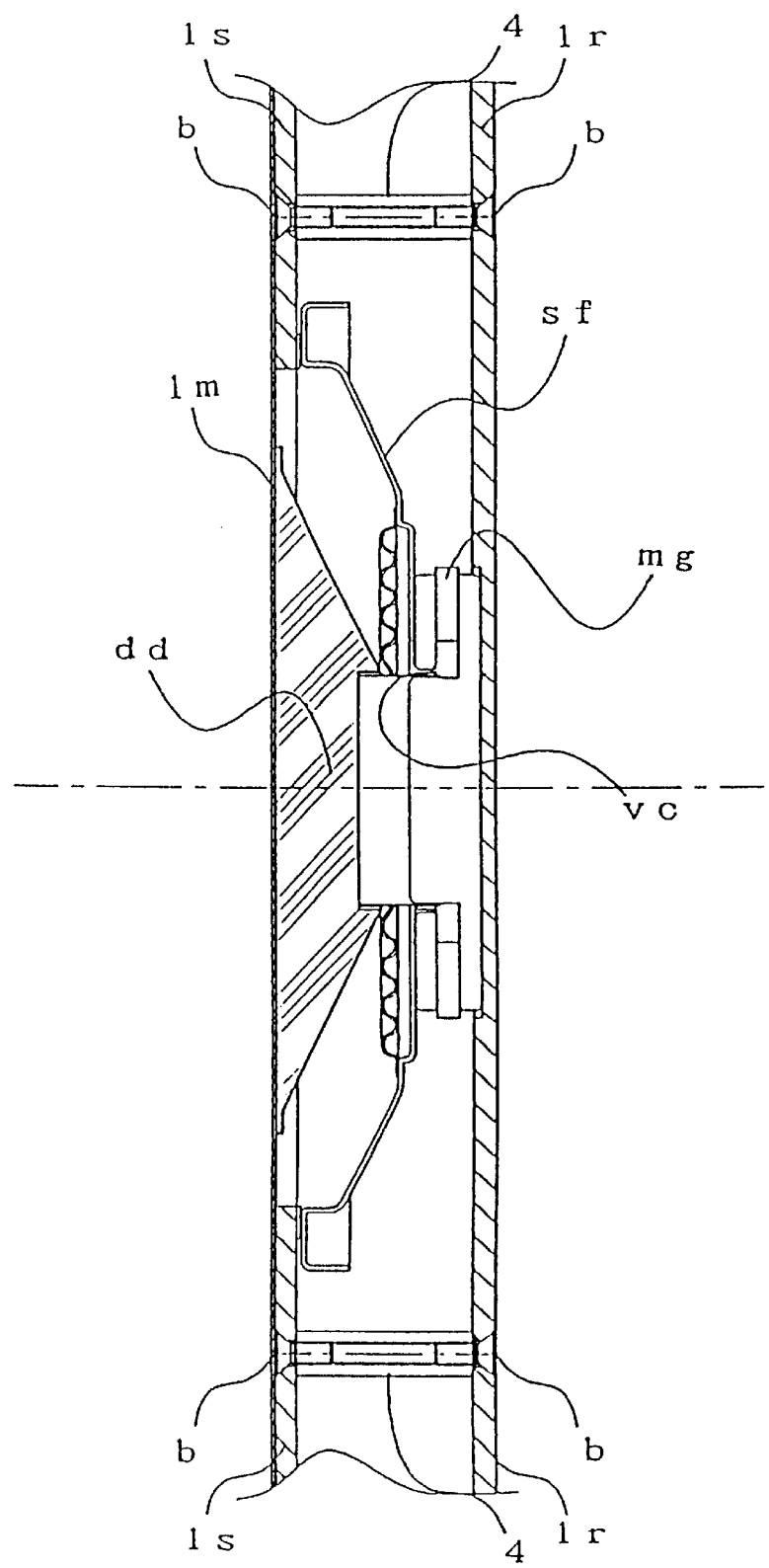
FIG. 20 is a cross sectional view explaining a direct drive of the front plate by a voice coil via an intervening member.
Figure 21:
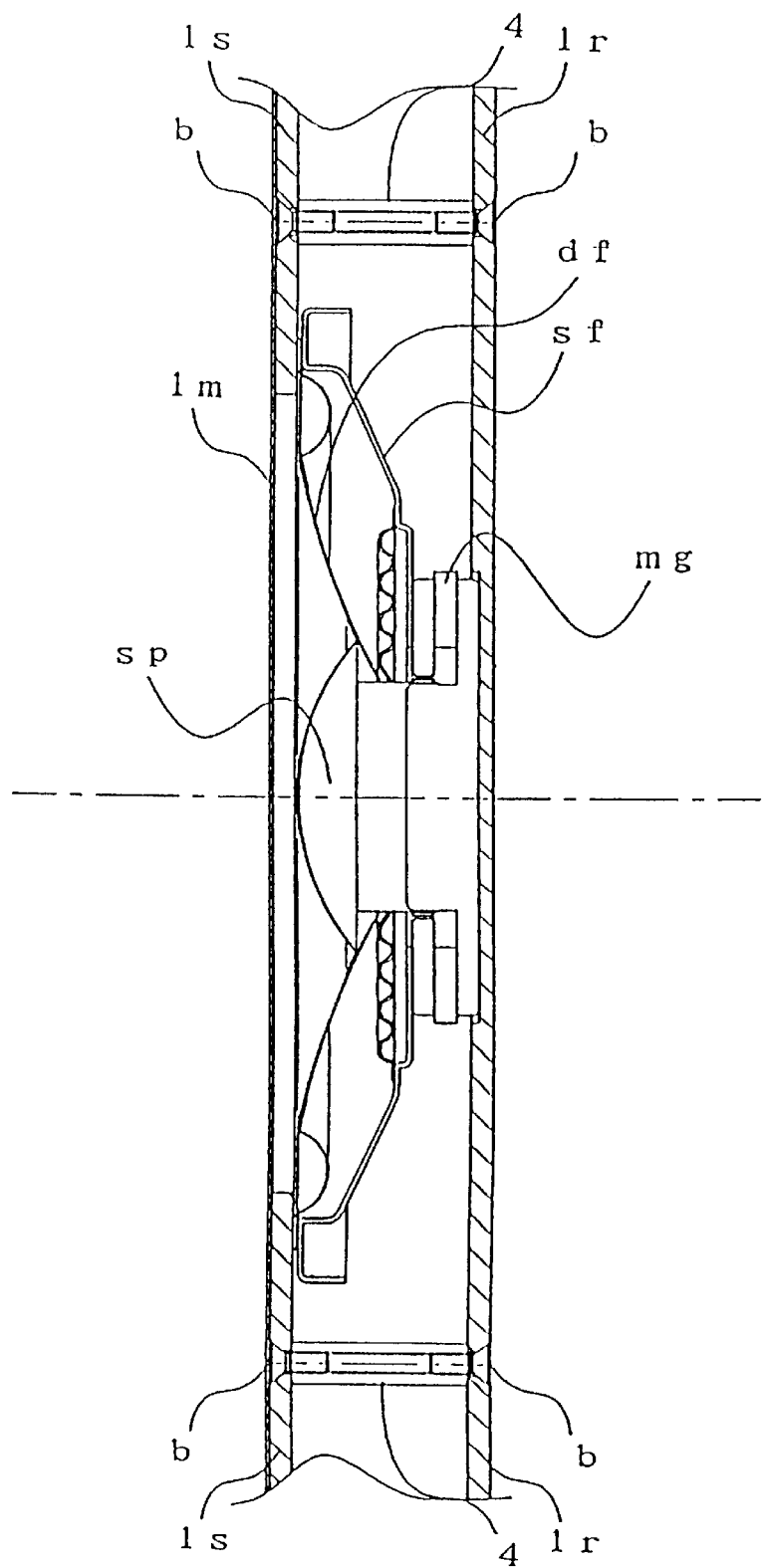
FIG. 21 is a cross sectional view showing the mount state of a screen member on the front plate.

In this embodiment, the resonance sounds by the front panel 1s are effectively utilized by selecting the proper materials and the like of the rear plate 1r, front plate 1s, partition plates 5a and 5b, sound path partition plates 3, support shafts 4, and the like, respectively of the screen housing Sc. As shown in FIG. 20, part of the front plate 1s may be cut off to directly drive a screen member 1m via a drive member dd on the inner surface of the screen member 1m by the voice coil vc, or the screen member 1m may be directly driven by directly attaching piezoelectric elements thereto. Alternatively, as shown in FIG. 21, a screen member 1m may be indirectly driven by setting a general speaker sp to the inner surface of the screen member 1m. A single screen member 1m may be attached to the whole front surface of the screen housing Sc and side speaker housing Ss, and as shown in FIG. 20, only the screen member 1m on the side speaker housing Ss may be driven by the voice coil vc via the drive member dd on the inner surface of the screen member 1m, or the screen member 1m may be directly driven by directly attaching piezoelectric elements thereto, or the screen member 1m may be indirectly driven by setting the general speaker sp to the inner surface of the screen member 1m.

In this embodiment, the front plate 1s and rear plate 1r are made of pieces of plates of different materials, each plate piece being made of a single material. Each plate piece may be made of a composite material such as resin and wood, and resin and metal, each plate piece may be a laminated plate such as a metal plate and a resin plate, and a carbon plate and a wood plate, or each plate may be a plate made of honeycomb materials disposed at desired areas. Plate pieces having a different thickness may be used for the front plate 1s and rear plate 1r. Although a number of screws b are used for the assembly of the embodiment screen speaker, it is obvious that a number of assembly processes using adhesive agent or a number of integrally molded components may be used in order to provide a more efficient assembly of the cabinet, particularly under mass production.

In the above embodiment, a 50-inch screen size is used. A larger screen size may also be used. For example, a screen speaker of a 70- or 100-inch screen size may also be manufactured. With a larger screen size, the inner volume of the cabinet increases and reproduction of low frequency sounds becomes easy.

In a screen speaker having a screen of 50 inches or larger as described in the above embodiment, a diaphragm system is disposed between the front plate and rear plate, the sound paths are formed for guiding sounds radiated from the front and rear sides of the diaphragm system, and the depths of both the sound paths are made equal to the depth of the inside of the cabinet (the distance between the inner surfaces of the front and rear plates). Accordingly, it is possible to realize a very thin screen speaker having the depth of the cabinet of about 30 mm and the depth of the inside of the cabinet of about 24 mm.

The fundamental structure of the cabinet having such an acoustic circuit has been proposed by the present inventors in Japanese Utility Model Laid-open Publication No.3-28895 as described earlier. If a screen speaker is made very thin as in this embodiment in accordance with the proposal made earlier by the present inventors, the depth of the sound path becomes very small and an acoustic loss (resistance) increases, so that sufficiently low sounds are difficult to be reproduced. However, with this embodiment structure, the depth of the sound path can be maximized. Therefore, the cross sectional area of the sound path can be made large, the acoustic loss can be made small, the practically sufficient pressure and quality of low sounds can be obtained, and the depth can be made smaller by about 50% than a conventional screen speaker.

Further, a speaker, speaker magnetic circuit, or components of the magnetic circuit are securely interposed directly or indirectly via a intermediate member, between the front and rear plates and between the side baffle and side rear plate. It is therefore easy to make the cabinet thinner. An integrated structure of the magnet circuit and cabinet improves the mechanical strength of the cabinet. Particularly in the case of a screen speaker which is thin, has a large area of the front and rear plates, and is required to use thin front and rear plates because of the thin screen speaker, the structure of the invention is very effective and greatly contributes to the improvement of the performance such as sound quality because of the improved mechanical strength.

Still further, a repulsion type magnetic circuit is disposed near at the central area between the front and rear plates of the screen cabinet, a diaphragm system and the like are disposed outward of the magnetic circuit, the diaphragm system is disposed near at the central area between the front and rear plates, and sounds generated from diaphragms are guided to and radiated from the area other than the front plate, for example, from the bottom plate or the like. It is therefore possible to easily mount low sound speakers in the cabinet having a limited depth.

The baffle in particular is positioned at the central area of the depth of the cabinet, sounds generated from one side of the diaphragm mounted on the baffle (sounds generated on the side of the front surface of the baffle) are guided to the back side of the baffle via the sound path formed in the cabinet, and combined with sounds generated from the other side (sounds generated on the side of the back surface of the baffle), and the combined sounds are radiated to the outside of the cabinet. Accordingly, practically sufficient low sounds, which have otherwise been considered to be difficult, can be reproduced even if the cabinet is thin and has a limited inner volume.

The sound path constituting plate provided in the cabinet interconnects the front and rear plates and provides a function of an reinforcing rib while forming the sound path. Therefore, the structure is suitable for thinning the cabinet, improves the cabinet strength, and reduces the number of components.

Stereo sounds generated from the speakers in the screen housing upon application of stereo signals are combined in the cabinet constituting the screen housing and guided outside of the cabinet. It is therefore possible to prevent an increase of an acoustic loss (resistance at the duct) and improve the low frequency characteristics and sound quality, by dividing one cabinet into two.

As seen from the frequency characteristics of the screen housing shown in FIG. 24, necessary low sounds can be preserved. The frequency characteristics of the side speaker housing are obtained as shown in FIG. 25. As seen from the frequency characteristics of both the screen housing and side speaker housing shown in FIG. 26, an audio band can be uniformly reproduced. Accordingly, in spite of a very thin screen speaker having the depth of the cabinet of 30 mm, a necessary and sufficient performance can be obtained over the range from low to high sounds.

The front plate is adapted to be resonated at desired sound pressures generated by the ultra thin speakers in the screen housing. With the increased sound pressure of a desired band, it is therefore effective for transmitting voices during video reproduction, particularly, effect sounds, while a very good atmosphere is provided during movie reproduction and clarity of sounds in particular is improved.

The effective resonance of the front plate and the sound quality control of a thin screen speaker of this embodiment can be easily realized while a practically usable cabinet structure is ensured. For example, the front and rear plates of the cabinet may be formed by plate pieces having two or more different materials or different thicknesses cut into desired sizes and combined as desired, or the support shafts, partition plates, and the like in the cabinet may be formed by different materials, different thicknesses, or different shapes, and may be disposed at desired positions.

A clear image in focus can be projected on the screen by setting the resonance amplitude of the front plate to a depth of field or smaller of a subject image projected by a projector, or by setting the resonance frequency to a frequency or higher at which the disturbance of a subject image to be caused by the resonance amplitude can not be visually recognized by human eyes, if the resonance amplitude is set to a depth of field or larger of the subject image projected by a projector.

A screen structure most suitable for thinning the screen speaker can be realized by directly adhering a screen sheet member to the front plate by using adhesive agent or a sticky tape. The screen sheet member is very thin and the ratio of its thickness to the depth of the cabinet is very small. The thickness of the screen sheet member is therefore negligible, and such a screen sheet member is most suitable for thinning the screen speaker.

Moreover, a sufficient flatness degree which is essential for projection of an image on the screen, can be easily obtained. The sound quality can be controlled by selecting a suitable material of the screen sheet member and suitable materials of adhesive agent and a sticky tape. The screen sheet member can be easily replaced by a new member when it becomes old or any time as desired.

Instead of adhering a screen sheet member, the screen surface may be formed by other methods such as coating material suitable for the screen on the front plate. For example, the screen surface can be formed by coating white paint mixed with aluminum particles, fine glass beads, and the like on the front plate. Mass production can be achieved by utilizing conventional coating techniques of speaker cabinets.

In this embodiment, the resonance of the front plate has been positively used. As another method, an opening may be formed in the front plate. A screen member is adhered to the front plate to cover the opening, and the screen member is directly or indirectly driven by the speaker unit. In this manner, desired sounds can be reproduced more efficiently and resonance sounds can be positively controlled. The reproduction bandwidth can be broadened if the screen member is matched without any sound quality problem. For example, such a speaker unit may be installed at the back of the screen as a pro-logic center speaker if this method is applied to the side speakers of this embodiment, all speakers can be installed at the back of the screen.

The < support leg of the screen speaker of this invention is made to be rotatable. When the screen speaker is installed near a wall, the < support legs are rotated to position the sides of the < support legs extending from the rear plate just under the bottom plate and the other sides of the < support legs in front of the screen speaker. Therefore, the screen speaker can be installed in tight contact with the wall. The dead space occupied by support legs of a conventional screen speaker extending from the rear plate can be removed, so that a space factor can be improved considerably.

In the screen speaker of this embodiment, after the rear plate is made in tight contact with a wall, the casters of the < support legs are locked while making the upper portion of the rear plate stand against the wall. In this state, the distance from the screen surface to the wall surface is about 30 mm which is generally the same as the depth of the cabinet and is shortened by about 80% more than the distance (155 mm) from the screen surface of a conventional screen speaker to the wall. It is very effective for reducing the installation area. Furthermore, the cabinet depth becomes considerably smaller than conventional so that the baffle effect can be efficiently used, allowing highly efficient sound reproduction. The support leg may be formed in a T-character shape, or may be made partially movable, with similar advantageous effects.

Still further, by mounting rotary members such as casters on the support leg at predetermined positions, the support leg can be smoothly rotated when the screen speaker is installed near a wall, facilitating the installation of the screen speaker near a wall and the transport thereof.

What is claimed is:

1. A speaker system comprising:
   a speaker cabinet provided with a front plate (1s) and a rear plate (1r), the plates being parallel to each other with a space;
   a speaker unit (Sp) contained in the speaker cabinet, the speaker unit being a repulsion type of speaker which comprises two magnets (M1, M2) stacked to face each other with the same magnetic polarity through a pole piece plate (P) for generating a repulsion magnetic field, a voice coil disposed in the repulsion magnetic field and a diaphragm (Da) driven by the voice coil;
   means (4m, 6) for securing the stacked magnets and pole piece sandwiched between the front plate and rear plate; and
   means (2) for positioning the diaphragm at a substantially midpoint in a space between the front plate and the rear plate, the positioned diaphragm being substantially parallel to the front and rear plates;

wherein a sound generated from the diaphragm propagates in a lateral direction within said speaker cabinet which constitutes a resonant structure.

2. A speaker system according to claim 1, wherein the thickness of the front plate is thin so that the sound vibrates the front plate to generate a secondly sound.

3. A speaker system according to claim 1, wherein the front plate functions as a screen for image projection.

4. A speaker system according to claim 3, wherein the resonance amplitude of said front plate is set to a depth of field or smaller of an image to be projected by a projector.

5. A speaker system according to claim 1, wherein said rear plate or said front plate constituting the cabinet is a combination of plate pieces made of at least two different materials or having at least two different thicknesses, each said plate piece having a desired size.

6. A speaker system according to claim 1, wherein shafts made of at least two different materials, having at least two different thicknesses, or having at least two different cross sections join said front plate and said rear plate to adjust the sound quality.

7. A speaker system according to claim 1, wherein at least two speakers are disposed in the cabinet, each speaker being applied with a stereo signal, and reproduced stereo sounds are combined in the cabinet and thereafter guided to the outside of the cabinet.

8. A speaker system according to claim 1, a sound generated by the diaphragm is radiated to the outside from an exit between the front plate and the rear plate.

9. A speaker system according to claim 8, further comprising a reinforced rib (3) for coupling the front plate and the rear plate, wherein said rib constitutes in cooperation with the front and rear plate a sound path which guides the sound to the exit.

10. A speaker system according to claim 9, wherein said sound constituting plate is a plate having at least two different materials, at least two different thicknesses, or at least two different sizes to adjust the sound quality.

11. A speaker system according to claim 1, further including leg means for supporting said speaker cabinet to be vertically installed on a floor, the leg means being of a L or T shape and adapted to be rotatable.

12. A speaker system according to claim 11, wherein said leg means includes a rotary member for reducing abrasion at the lower end of the support leg.

13. A speaker system comprising:
  a speaker cabinet provided with a front plate (1s) and a rear plate (1r), the plates being parallel to each other with a space;
  a speaker unit (Sp) contained in the speaker cabinet, the speaker unit being a repulsion type of speaker which comprises two magnets (M1, M2), stacked to face each other with the same magnetic polarity through a pole piece plate (P) for generating a repulsion magnetic field, a voice coil disposed in the repulsion magnetic field and a diaphragm (Da) driven by the voice coil;
  means (2) for positioning the diaphragm at a substantially midpoint in a space between the front plate and the rear plate, the positioned diaphragm being substantially parallel to the front and rear plates;
  an exit (6) provided between the front plate and the rear plate for radiating a sound generated by the diaphragm to the outside therefrom; and
  a reinforced rib (3) for coupling the front plate and the rear plate, wherein said reinforced rib constitutes in cooperation with the front and rear plates a sound path which guides the sound to the exit;
  wherein a sound generated from the diaphragm propagates in a lateral direction within said speaker cabinet which constitutes a resonant structure.

14. A speaker system according to claim 13, wherein a baffle is disposed in the cabinet, said diaphragm being mounted on said baffle, sounds radiated from said diaphragm on the front side of said baffle are guided via said sound path formed in the cabinet to the back side of said baffle, and combined with sounds radiated from said diaphragm on the back side of said baffle, said combined sounds being guided to the outside of the cabinet.

15. A speaker system according to claim 13, wherein said speaker disposed in the cabinet resonates a side plate constituting the cabinet.

16. A speaker system according to claim 13, wherein said rear plate or said front plate constituting the cabinet is a combination of plate pieces made of at least two different materials or having different thicknesses, each said plate piece having a desired size.

17. A speaker system according to claim 13, wherein shafts made of at least two different materials, having at least two different thicknesses, or having at least two different cross sections join said front plate and said rear plate to adjust the sound quality.

18. A speaker system according to claim 11, wherein at least two speakers are disposed in the cabinet, each speaker being applied with a stereo signal, and reproduced stereo sounds are combined in the cabinet and thereafter guided to the outside of the cabinet.

19. A speaker system according to claim 15, wherein if the resonance amplitude of said front plate is set to a depth of field or larger of an image to be projected by a projector, the resonance frequency is set to a frequency or higher at which the disturbance of a subject image to be caused by the resonance amplitude can not be visually recognized by human eyes.

20. A speaker system according to claim 15, wherein the resonance amplitude of said front plate is set to a depth of field or smaller of an image to be projected by a projector.

21. A speaker system according to claim 13 further including leg means for supporting said speaker cabinet to be vertically installed on a floor, the leg means being of a L or T shape and adapted to be rotatable.

22. A speaker system according to claim 21, wherein said leg means includes a rotary member for reducing abrasion at the lower end of the support leg.

* * * * *